United States Patent
Ushijima

(10) Patent No.: US 11,348,324 B2
(45) Date of Patent: May 31, 2022

(54) CALCULATION METHOD, NON-TRANSITORY COMPUTER READABLE RECORDING MEDIUM, AND INFORMATION PROCESSING DEVICE

(71) Applicant: FUJITSU LIMITED, Kawasaki (JP)

(72) Inventor: Satoru Ushijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 195 days.

(21) Appl. No.: 16/831,803

(22) Filed: Mar. 27, 2020

(65) Prior Publication Data

US 2020/0226847 A1 Jul. 16, 2020

Related U.S. Application Data

(63) Continuation of application No. PCT/JP2017/039991, filed on Nov. 6, 2017.

(51) Int. Cl.
*G06T 19/20* (2011.01)
*G01B 11/27* (2006.01)
(Continued)

(52) U.S. Cl.
CPC .......... *G06T 19/20* (2013.01); *G01B 11/272* (2013.01); *G01S 17/08* (2013.01); *G01S 17/89* (2013.01);
(Continued)

(58) Field of Classification Search
CPC .......... G06T 19/20; G06T 5/002; G06T 5/50; G06T 2207/10028; G06T 2207/20192;
(Continued)

(56) References Cited

U.S. PATENT DOCUMENTS 9,207,069 B2 * 12/2015 Kitamura ............... G01B 11/24
9,467,682 B2 * 10/2016 Watanabe ................ G06T 7/75
(Continued)

FOREIGN PATENT DOCUMENTS

JP 2011-175477 A 9/2011
JP 2012-526335 A 10/2012
JP 2013-58106 A 3/2013

OTHER PUBLICATIONS

International Search Report and Written Opinion dated Jan. 16, 2018 for PCT/JP2017/039991 filed on Nov. 6, 2017, 6 pages including English Translation of the International Search Report.

*Primary Examiner* — Gregory M Desire
(74) *Attorney, Agent, or Firm* — Xsensus LLP

(57) ABSTRACT

An information processing device (100) extracts a first point group constituting an object from a first distance image acquired by a first sensor. The information processing device (100) extracts a second point group constituting an object from a second distance image acquired by a second sensor. The information processing device (100) generates a first translated point group by translating the first point group by first translation coordinates. The information processing device (100) generates a second translated point group by translating the second point group by second translation coordinates. The information processing device (100) calculates a rotation parameter and a translation parameter based on the first translated point group and the second translated point group.

12 Claims, 30 Drawing Sheets

(51) Int. Cl.
*G01S 17/08* (2006.01)
*G01S 17/89* (2020.01)
*G06T 5/00* (2006.01)
*G06T 5/50* (2006.01)

(52) U.S. Cl.
CPC ............... *G06T 5/002* (2013.01); *G06T 5/50* (2013.01); *G06T 2207/10028* (2013.01); *G06T 2207/20192* (2013.01); *G06T 2219/2016* (2013.01)

(58) Field of Classification Search
CPC ........... G06T 2219/2016; G01B 11/272; G01S 17/08; G01S 17/89
See application file for complete search history.

(56) References Cited

U.S. PATENT DOCUMENTS

| | | | | |
|---|---|---|---|---|
| 9,488,721 | B2* | 11/2016 | Kitajima | G06T 5/20 |
| 9,934,585 | B2* | 4/2018 | Oh | G06T 7/33 |
| 10,310,675 | B2* | 6/2019 | Oshima | G06F 3/04883 |
| 10,469,836 | B2* | 11/2019 | Fu | H04N 13/271 |
| 2011/0298988 | A1* | 12/2011 | Kawai | G06T 5/006 |
| | | | | 348/699 |
| 2012/0121132 | A1 | 5/2012 | Asahara et al. | |
| 2012/0268567 | A1 | 10/2012 | Nakazato et al. | |
| 2017/0223338 | A1* | 8/2017 | Kang | G01B 11/24 |
| 2017/0293354 | A1* | 10/2017 | Lu | G06V 20/64 |
| 2017/0323443 | A1* | 11/2017 | Dhruwdas | G06T 7/0012 |
| 2020/0226847 | A1* | 7/2020 | Ushijima | G01S 17/08 |
| 2021/0049774 | A1* | 2/2021 | Zink | G06V 10/443 |
| 2021/0223022 | A1* | 7/2021 | Okuni | G01S 7/4972 |

* cited by examiner

FIG.3
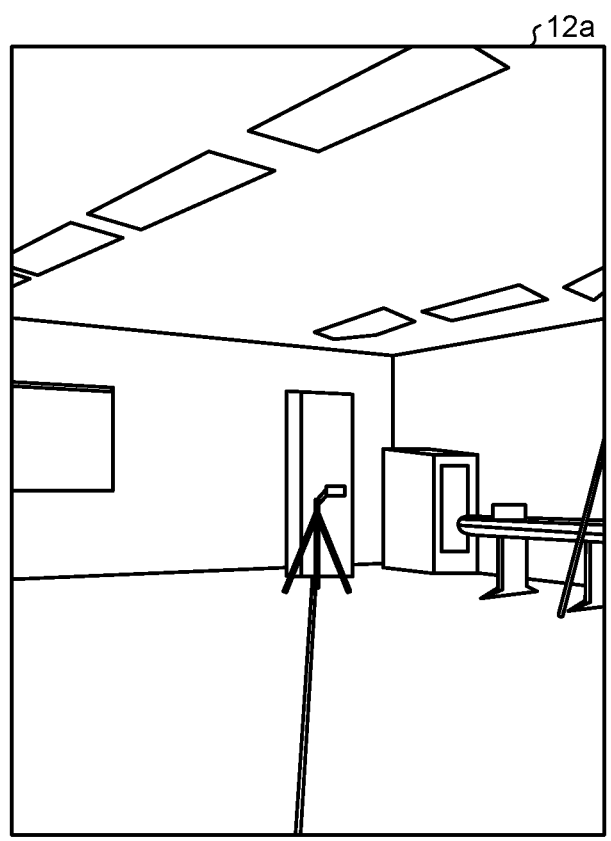

FIG.4
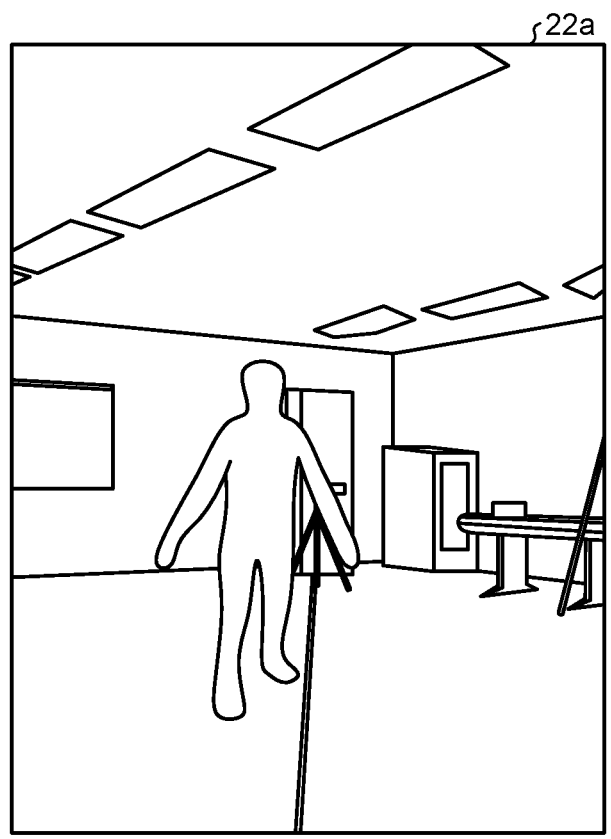

FIG.10

POINT GROUP TABLE  140b

POINT GROUP IDENTIFICATION INFORMATION: POINT GROUP 10A  142a

| TIME | COORDINATE INFORMATION OF POINT GROUP 10A |
|---|---|
| t1 | COORDINATE INFORMATION OF POINT GROUP 10A AT t1 |
| t2 | COORDINATE INFORMATION OF POINT GROUP 10A AT t2 |
| t3 | COORDINATE INFORMATION OF POINT GROUP 10A AT t3 |
| ... | ... |

POINT GROUP IDENTIFICATION INFORMATION: POINT GROUP 10B  142b

| TIME | COORDINATE INFORMATION OF POINT GROUP 10B |
|---|---|
| t1 | COORDINATE INFORMATION OF POINT GROUP 10B AT t1 |
| t2 | COORDINATE INFORMATION OF POINT GROUP 10B AT t2 |
| t3 | COORDINATE INFORMATION OF POINT GROUP 10B AT t3 |
| ... | ... |

FIG.11

| POINT COORDINATE INFORMATION | COORDINATES |
|---|---|
| 10001a | xa1, ya1, za1 |
| 10002a | xa2, ya2, za2 |
| 10003a | xa3, ya3, za3 |
| 10004a | xa4, ya4, za4 |
| ... | ... |

FIG.12

| PARAMETER | | | | 140c |
|---|---|---|---|---|
| POINT GROUP IDENTIFICATION INFORMATION: POINT GROUP 10A | | | POINT GROUP IDENTIFICATION INFORMATION: POINT GROUP 10B | |
| X-TRANSLATION DISTANCE | XSa | | X-TRANSLATION DISTANCE | XSb |
| Y-TRANSLATION DISTANCE | YSa | | Y-TRANSLATION DISTANCE | YSb |
| Z-TRANSLATION DISTANCE | ZSa | | Z-TRANSLATION DISTANCE | ZSb |
| X-ROTATION ANGLE | XRa | | X-ROTATION ANGLE | 0 |
| Y-ROTATION ANGLE | YRa | | Y-ROTATION ANGLE | 0 |
| Z-ROTATION ANGLE | ZRa | | Z-ROTATION ANGLE | 0 |

FIG.13

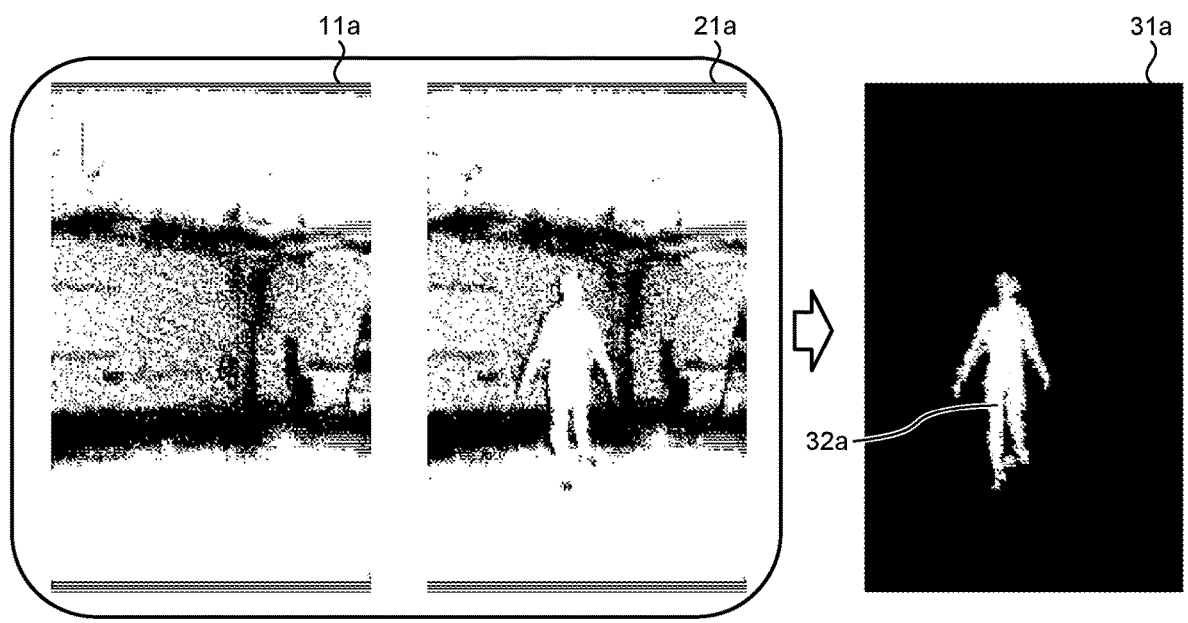

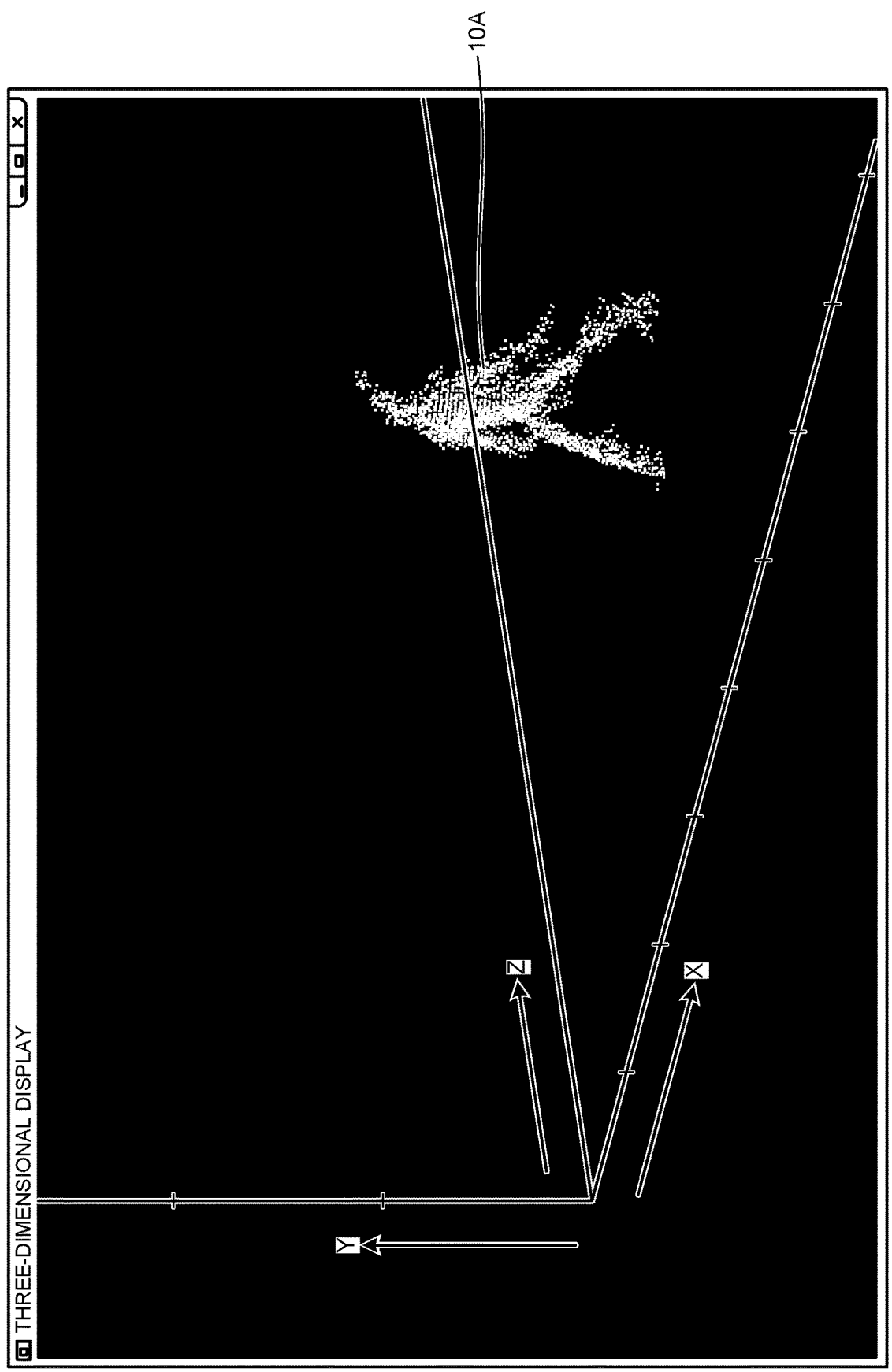

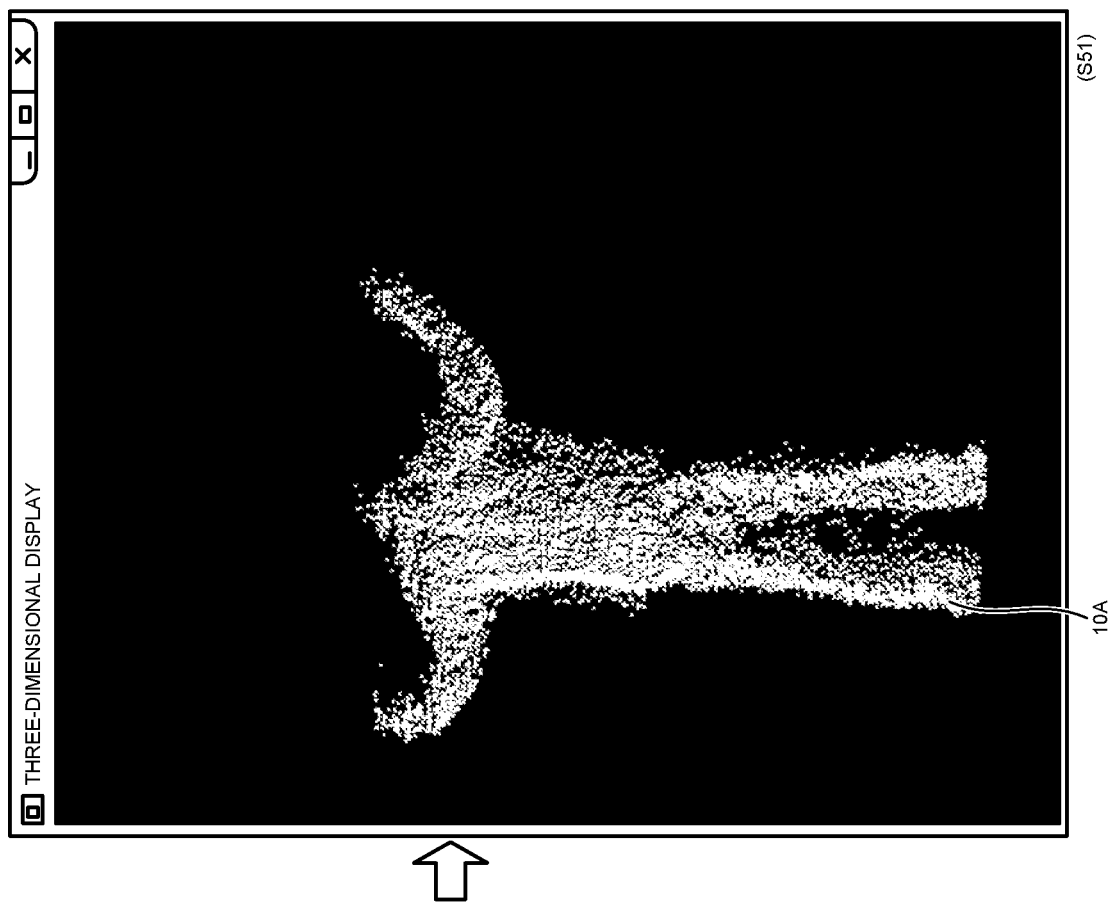
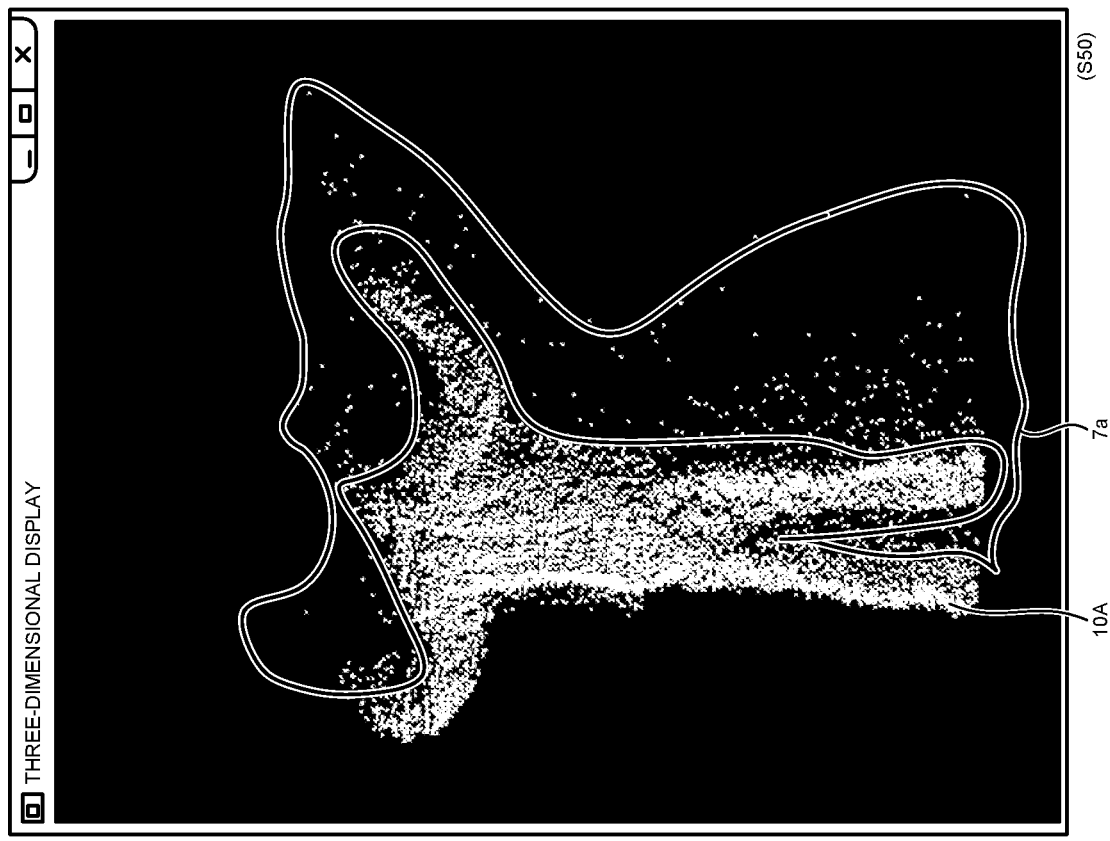
FIG.27

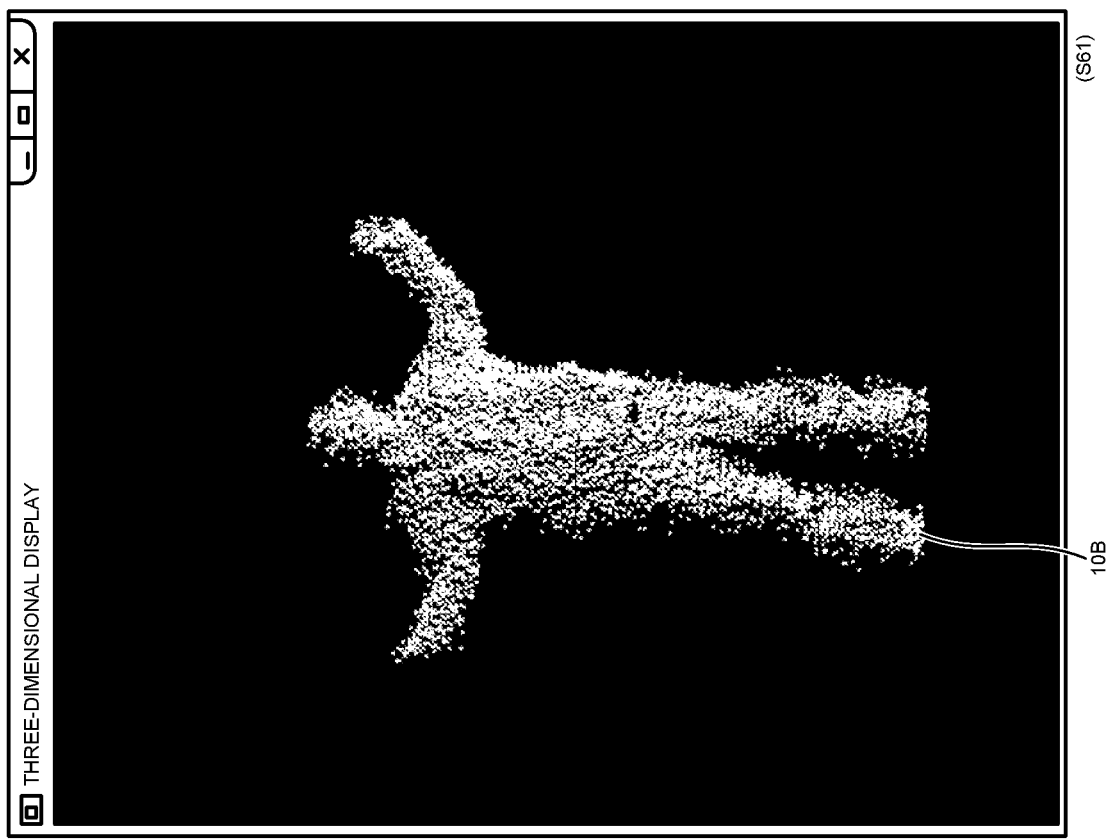
FIG.28
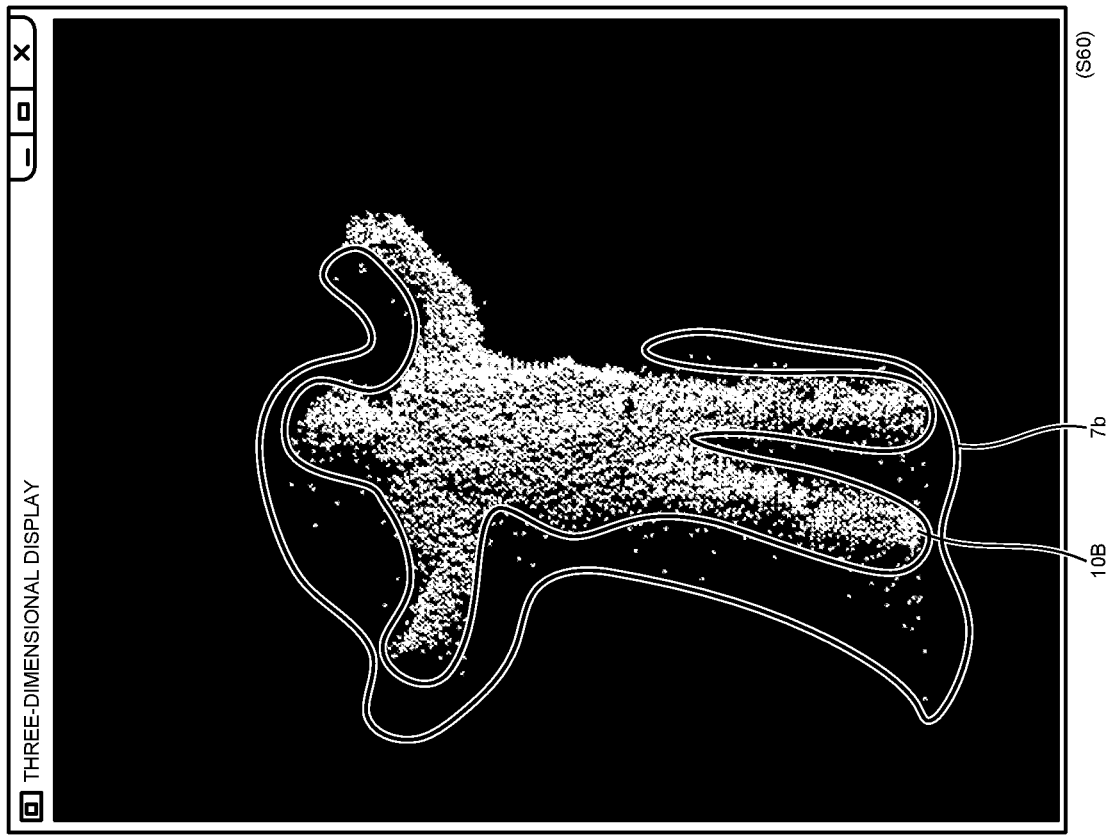

CALCULATION METHOD, NON-TRANSITORY COMPUTER READABLE RECORDING MEDIUM, AND INFORMATION PROCESSING DEVICE

CROSS-REFERENCE TO RELATED APPLICATION(S)

This application is a continuation of International Application No. PCT/JP2017/039991, filed on Nov. 6, 2017, the entire contents of which are incorporated herein by reference.

FIELD

The embodiments discussed herein are related to a calculation method and the like.

BACKGROUND

There is a technique for using a distant measuring device, such as a laser sensor, to detect a three-dimensional point group of an object and recognize the posture and the like of the object. In the following description, a laser sensor for detecting a three-dimensional point group of an object is merely referred to as a "sensor".

When one sensor is used, a three-dimensional point group of an object viewed from the sensor side (in one direction) is able to be obtained, but a three-dimensional point group of the object viewed from the side opposite to the sensor is not able to be obtained, and thus the accuracy of recognizing the posture and the like of the object is low in some cases. Therefore, a plurality of sensors are used to obtain a three-dimensional group of the object viewed from a plurality of directions and improve the accuracy of recognizing the posture and the like of the object.

When a plurality of sensors are used to detect a three-dimensional point group of an object, a process of aligning each of three-dimensional point groups detected from the sensors and integrating the three-dimensional point groups into one three-dimensional group is executed. In the following description, a process of aligning each of three-dimensional point groups detected from the sensors and integrating the three-dimensional point groups into one three-dimensional group is referred to as "calibration".

As a conventional technique related to the calibration, there is a conventional device using iterative closest point (ICP). This conventional device searches for the minimum value of a distance between a point neighboring a first three-dimensional point group and a point neighboring a fixed second three-dimensional point group while translating and rotating the first three-dimensional point group to identify a translation value and a rotational angle for alignment of the first three-dimensional point group and the second dimensional point group.

FIGS. 34 and 35 are flowcharts illustrating an example of a process procedure by the conventional device using ICP. Translation values (XS, YS, ZS) illustrated in FIGS. 34 and 35 correspond to the first three-dimensional point group. For example, XS indicates a translation value on an x axis, YS indicates a translation value on a y axis, and ZS indicates a translation value on a z axis. Rotational angles (XR, YR, ZR) correspond to the first three-dimensional point group. For example, XR indicates a rotational angle (roll) about the x axis, YR indicates a rotational angle (pitch) about the y axis, and ZR indicates a rotational angle (yaw) about the z axis.

As illustrated in FIG. 34, the conventional device sets an X-translation start coordinate to XS (step S10). The conventional device determines whether XS is less than an X-translation end coordinate (step S11). When XS is not less than the X-translation end coordinate (No at step S11), the conventional device outputs results (step S12). For example, at step S12, the conventional device outputs, as the results, translation values (XS, YS, ZS) and rotation values (XR, YR, ZR) of the first three-dimensional point group that cause the distance between the point neighboring the first three-dimensional point group and the point neighboring the second three-dimensional point group to be smallest. Translation values and rotation values of the second three-dimensional point group are all 0.

When XS is less than the X-translation end coordinate (Yes at step S11), the conventional device sets a Y-translation start coordinate to YS (step S13). The conventional device determines whether YS is less than a Y-translation end coordinate (step S14). When YS is not less than the Y-translation end coordinate (No at step S14), the conventional device updates XS using a value obtained by adding an increase in the coordinate to XS (step S15) and causes the process to proceed to step S11.

When YS is less than the Y-translation end coordinate (Yes at step S14), the conventional device sets a Z-translation start coordinate to ZS (step S16). The conventional device determines whether ZS is less than a Z-translation end coordinate (step S17). When ZS is not less than the Z-translation end coordinate (No at step S17), the conventional device updates YS using a value obtained by adding an increase in the coordinate to YS (step S18) and causes the process to proceed to step S14.

When ZS is less than the Z-translation end coordinate (Yes at step S17), the conventional device translates the first three-dimensional point group by XS, YS, and ZS (step S19) and causes the process to proceed to step S20 illustrated in FIG. 35.

The conventional device sets an X-rotation start angle to XR (step S20). The conventional device determines whether XR is less than an X-rotation end angle (step S21). When XR is not less than the X-rotation end angle (No at step S21), the conventional device updates ZS using a value obtained by adding an increase in the coordinate to ZS (step S22) and causes the process to proceed to step S17 illustrated in FIG. 34.

When XR is less than the X-rotation end angle (Yes at step S21), the conventional device sets a Y-rotation start angle to YR (step S23). The conventional device determines whether YR is less than a Y-rotation end angle (step S24). When YR is not less than the Y-rotation end angle (No at step S24), the conventional device updates XR using a value obtained by adding an increase in the angle to XR (step S25) and causes the process to proceed to step S21.

When YR is less than the Y-rotation end angle (Yes at step S24), the conventional device sets a Z-rotation start angle to ZR (step S26). The conventional device determines whether ZR is less than a Z-rotation end angle (step S27). When ZR is not less than the Z-rotation end angle (No at step S27), the conventional device updates YR using a value obtained by adding an increase in the angle to YR (step S28) and causes the process to proceed to step S24.

When ZR is less than the Z-rotation end angle (Yes at step S27), the conventional device rotates the first three-dimensional point group by XR, YR, and ZR (step S29). The conventional device calculates a distance between points neighboring the first and the second three-dimensional point groups after the translation and rotation processes (step S30). The conventional device updates ZR using a value obtained by adding an increase in the angle to ZR (step S31) and causes the process to proceed to step S27.

Among conventional techniques based on ICP, there is a technique for selecting a point on geometric characteristics of a three-dimensional shape model from a three-dimensional point group and executing the processes illustrated in FIGS. 34 and 35 on the selected point to reduce an amount to be processed. Examples of related art are Japanese Laid-open Patent Publication No. 2011-175477 and Japanese Laid-open Patent Publication No. 2013-58106.

SUMMARY

According to an aspect of an embodiment, a calculation method executed by a processor includes first extracting a first point group constituting an object from a first distance image acquired by a first sensor among a plurality of sensors for sensing a distance to the object; second extracting a second point group constituting the object from a second distance image acquired by a second sensor among the sensors; first generating, based on the first point group and first translation coordinates by which the position of the first sensor is translated to the position of the object, a first translated point group by translating the first point group by the first translation coordinates; second generating, based on the second point group and second translation coordinates by which the position of the second sensor is translated to the position of the object, a second translated point group by translating the second point group by the second translation coordinates; calculating, based on the first translated point group and the second translated point group, a rotation parameter to be used to align the first point group and the second point group in a rotational direction; and calculating, based on the first translation coordinates and the second translation coordinates, a translation parameter to be used to align the first point group and the second point group in a translation direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a first background frame measured by a sensor 10$a$;

FIG. 4 is a diagram illustrating an example of a first distance image frame measured by the sensor 10$a$;

FIG. 10 is a diagram illustrating an example of a data structure of a point group table according to the first embodiment;

FIG. 11 is a diagram describing an example of coordinate information of a point group;

FIG. 12 is a diagram illustrating an example of a data structure of a parameter according to the first embodiment;

FIG. 13 is a diagram describing a process by an extractor according to the first embodiment;

FIG. 14 is a diagram illustrating an example of a point group 10A;

FIG. 15 is a diagram illustrating an example of a point group 10B;

FIG. 27 is a diagram illustrating an example of the point group 10A before and after edge noise removal;

FIG. 28 is a diagram illustrating an example of the point group 10B before and after the edge noise removal;

DESCRIPTION OF EMBODIMENTS

The foregoing conventional technique, however, has a problem in that it is not possible to reduce a processing load caused by calculation of a translation parameter for alignment.

In the foregoing conventional technique, the number of targets to be aligned is reduced by selecting a point on geometric characteristics of a three-dimensional shape model, but the alignment of each point group is executed while translating and rotating the point group, and thus a processing load is large.

Preferred embodiments of the present invention will be explained with reference to accompanying drawings. The invention is not limited by the embodiments.

[a] First Embodiment

Figure 1:
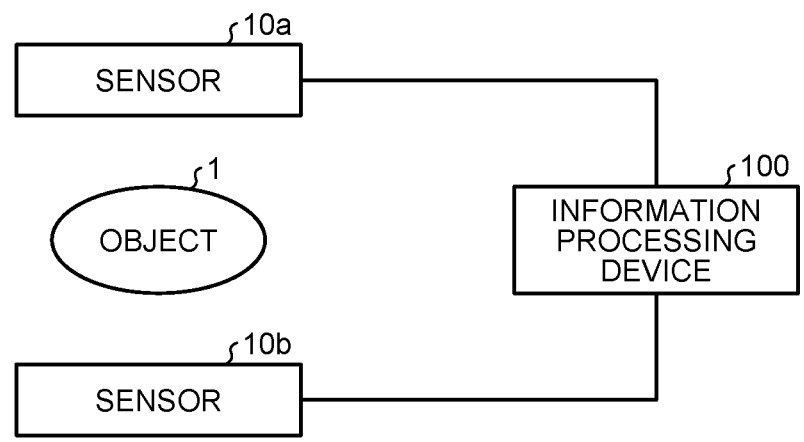
FIG. 1 is a diagram illustrating a configuration of a system according to a first embodiment.

FIG. 1 is a diagram illustrating a configuration of a system according to a first embodiment. As illustrated in FIG. 1, a sensor 10a and a sensor 10b are installed in front of and behind an object 1. The sensor 10a and the sensor 10b are coupled to an information processing device 100. The first embodiment describes the object 1 as a person as an example, but an object other than a person may be used as the object 1 as long as the object is a three-dimensional object.

The sensor 10a is a measuring device that measures a distance between a point group constituting the object 1 and the sensor 10a. In the following description, information of a distance between a point group constituting the object 1 measured by the sensor 10a and the sensor 10a at a time to is referred to as a "first distance image frame". The sensor 10a repeatedly executes the foregoing process of measuring the distance at each of predetermined times and outputs first distance image frames to the information processing device 100.

The sensor 10a outputs, to the information processing device 100, a first distance image frame not including distance information of the object 1 that has been measured when the object 1 does not exist. The first distance image frame not including the distance information of the object 1 is referred to as a "first background frame".

The sensor 10b is a measuring device that measures a distance between a point group constituting the object 1 and the sensor 10b. In the following description, information of a distance between a point group constituting the object 1 measured by the sensor 10b and the sensor 10b at the time to is referred to as a second distance image frame. The sensor 10b repeatedly executes the foregoing process of measuring the distance at each of the predetermined times and outputs second distance image frames to the information processing device 100.

The sensor 10b outputs, to the information processing device 100, a second distance image frame not including distance information of the object 1 that has been measured when the object 1 does not exist. The second distance image frame not including the distance information of the object 1 is referred to as a "second background frame".

Figure 2:
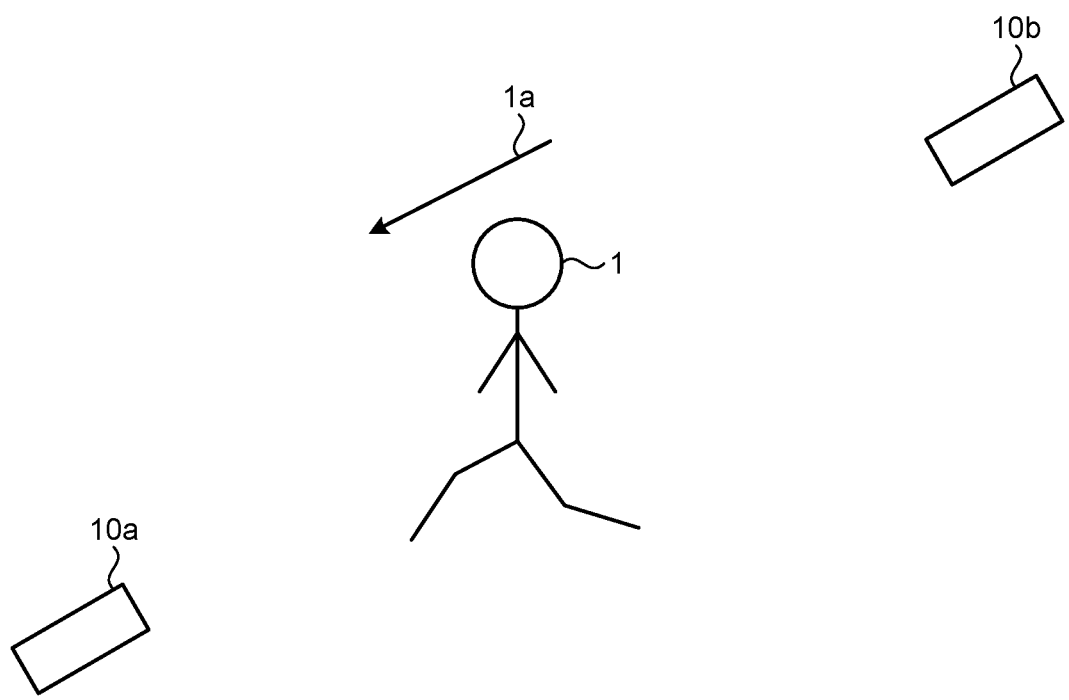
FIG. 2 is a diagram illustrating installation states of sensors according to the first embodiment.

FIG. 2 is a diagram illustrating an example of installation states of the sensors according to the first embodiment. In the example illustrated in FIG. 2, a movement direction of the object 1 is indicated by an arrow 1a. The sensor 10a is installed on the side toward which the object 1 moves. The sensor 10b is installed on the side opposite to the side toward which the object 1 moves.

FIG. 3 is a diagram illustrating an example of the first background frame measured by the sensor 10a. FIG. 3 indicates that a first background frame 11a is associated with a visible image 12a captured by a camera (camera that captures an image in the same direction as the sensor 10a) as an example. In the first background frame 11a, as a region is darker, a distance from the sensor 10a is longer.

FIG. 4 is a diagram illustrating an example of the first distance image frame measured by the sensor 10a. FIG. 4 indicates that a first distance image frame 21a is associated with a visible image 22a captured by the camera (camera that captures an image in the same direction as the sensor 10a) as an example. In the first distance image frame, as a region is darker, a distance from the sensor 10a is longer.

Figure 5:
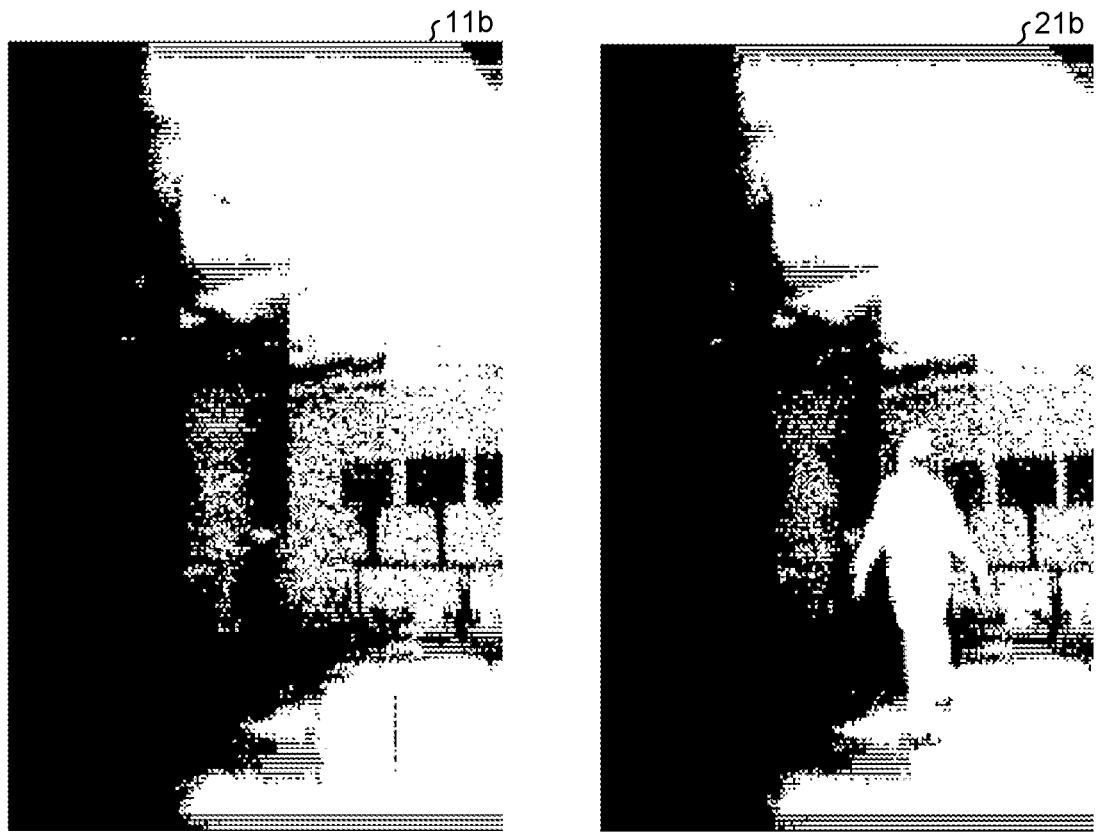
FIG. 5 is a diagram illustrating an example of a second background frame measured by a sensor 10$b$ and a second distance image frame measured by the sensor 10$b$.

FIG. 5 is a diagram illustrating an example of the second background frame measured by the sensor 10b and the second distance image frame measured by the sensor 10b. As illustrated in FIG. 5, in a second background frame 11b and a second distance image frame 21b, as a region is darker, a distance from the sensor 10b is longer.

Figure 6:
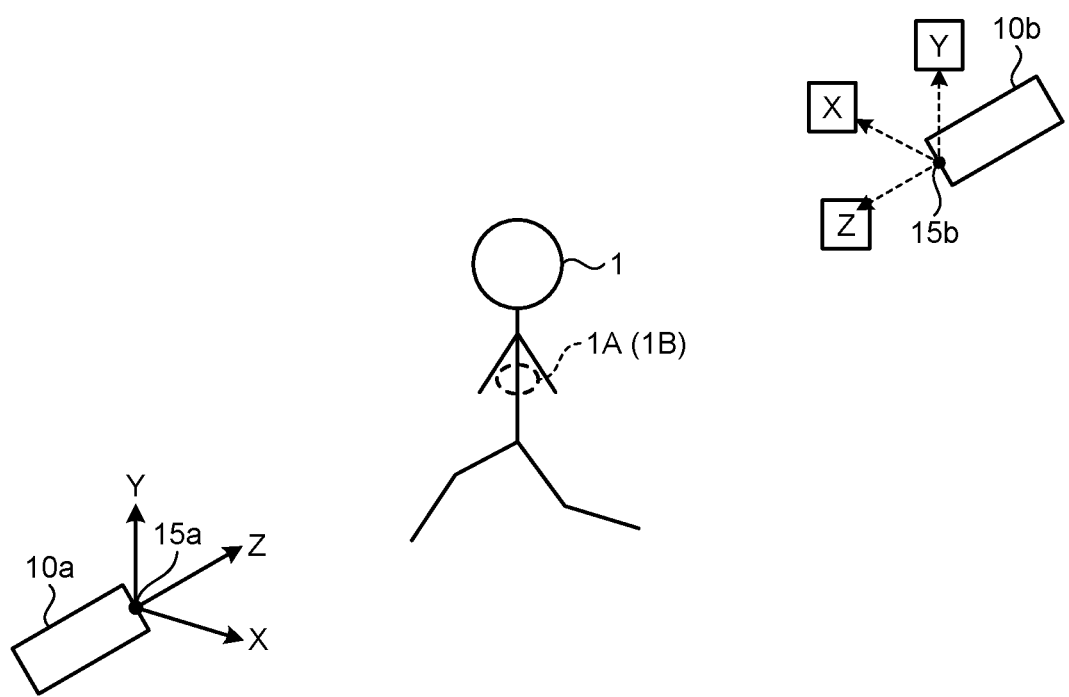
FIG. 6 is a (first) diagram describing an example of a process by an information processing device according to the first embodiment.
Figure 7:
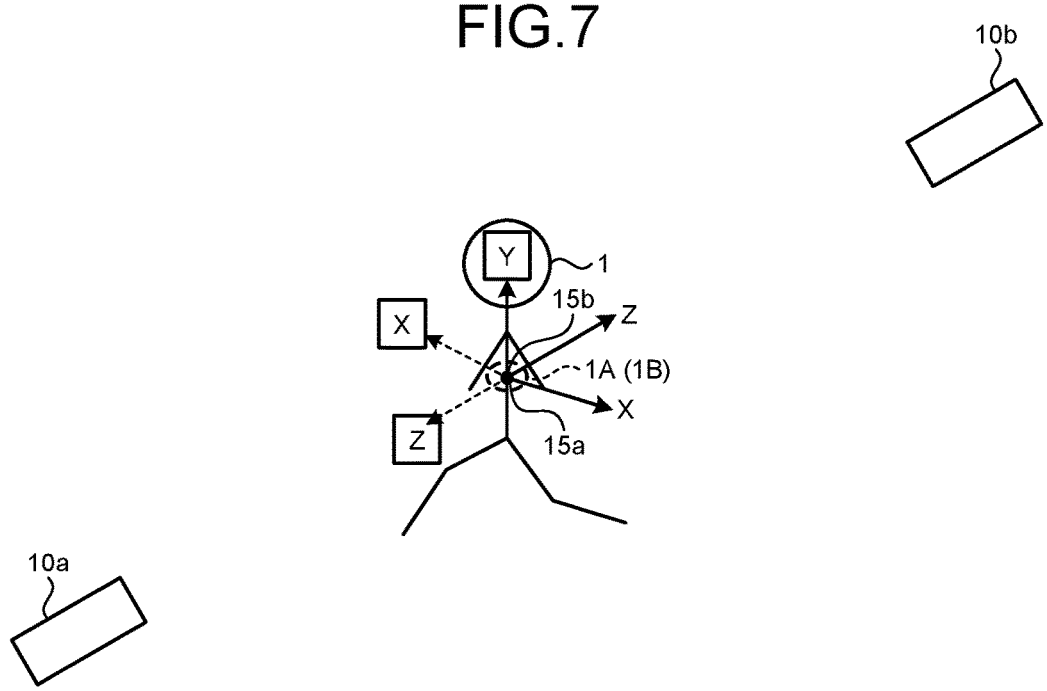
FIG. 7 is a (second) diagram describing the example of the process by the information processing device according to the first embodiment.

Return to the description of FIG. 1. The information processing device 100 aligns the position of a point group of the object 1 measured by the sensor 10a with the position of a point group of the object 1 measured by the sensor 10b. FIGS. 6 and 7 are diagrams describing an example of a process by the information processing device according to the first embodiment.

FIG. 6 is described below. The information processing device 100 calculates average coordinates 1A of the object 1 based on the first distance image frame measured by the sensor 10a. The information processing device 100 calculates average coordinates 1B of the object 1 based on the second distance image frame measured by the sensor 10b. Origin coordinates of the sensor 10a are origin coordinates 15a, while origin coordinates of the sensor 10b are origin coordinates 15b.

FIG. 7 is described below. The information processing device 100 completes alignment in a translation direction by moving the origin coordinates 15a to the average coordinates 1A and moving the origin coordinates 15b to the average coordinates 1B. Moving the origin coordinates 15a to the average coordinates 1A corresponds to reversely translating the coordinates of the point group of the object 1 measured by the sensor 10a by the average coordinates 1A. Moving the origin coordinates 15b to the average coordinates 1B corresponds to translating the coordinates of the point group of the object 1 measured by the sensor 10b by the average coordinates 1B.

Figure 34:
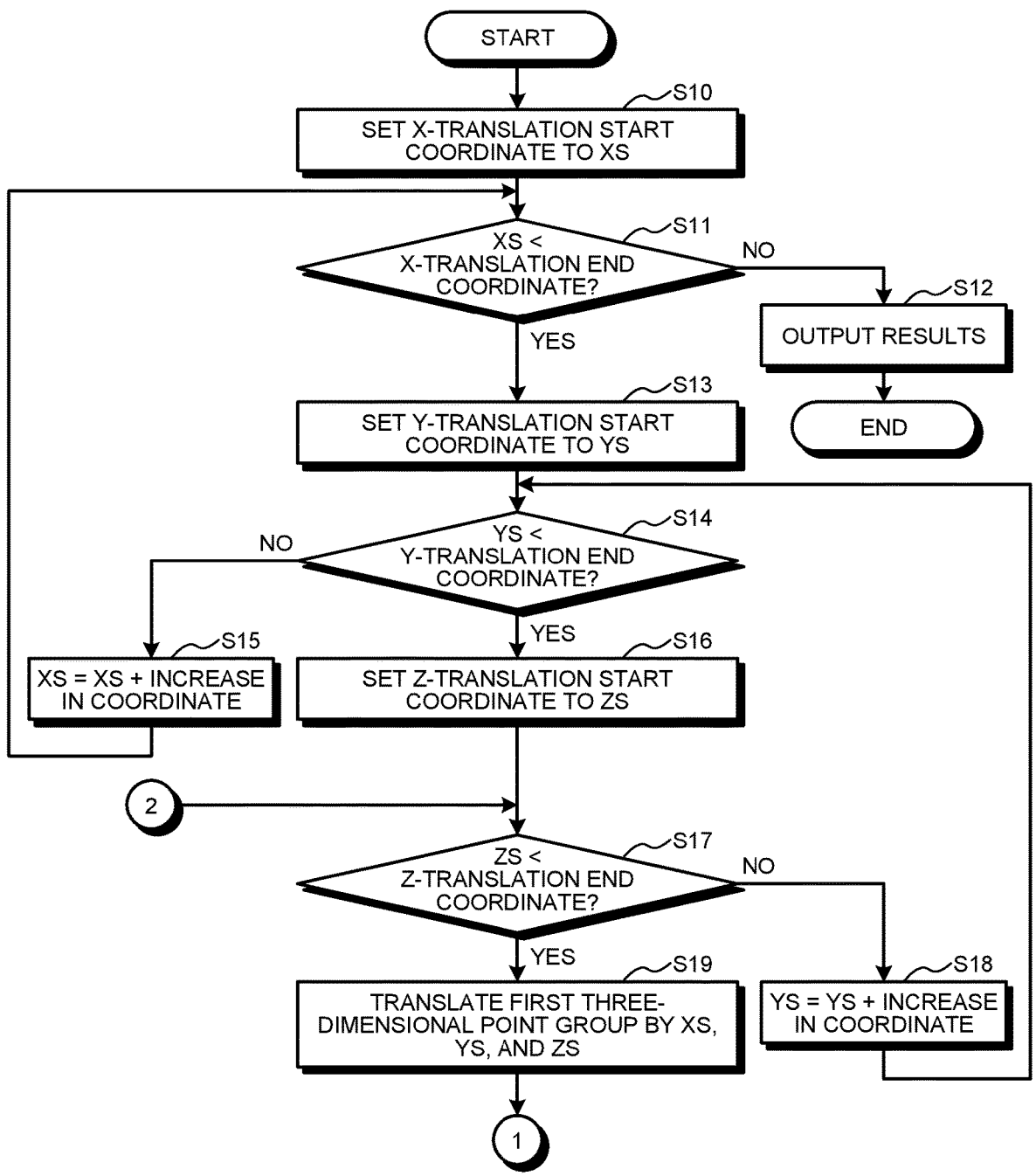
FIG. 34 is a (first) flowchart illustrating an example of a process procedure by a conventional device using ICP.
Figure 35:
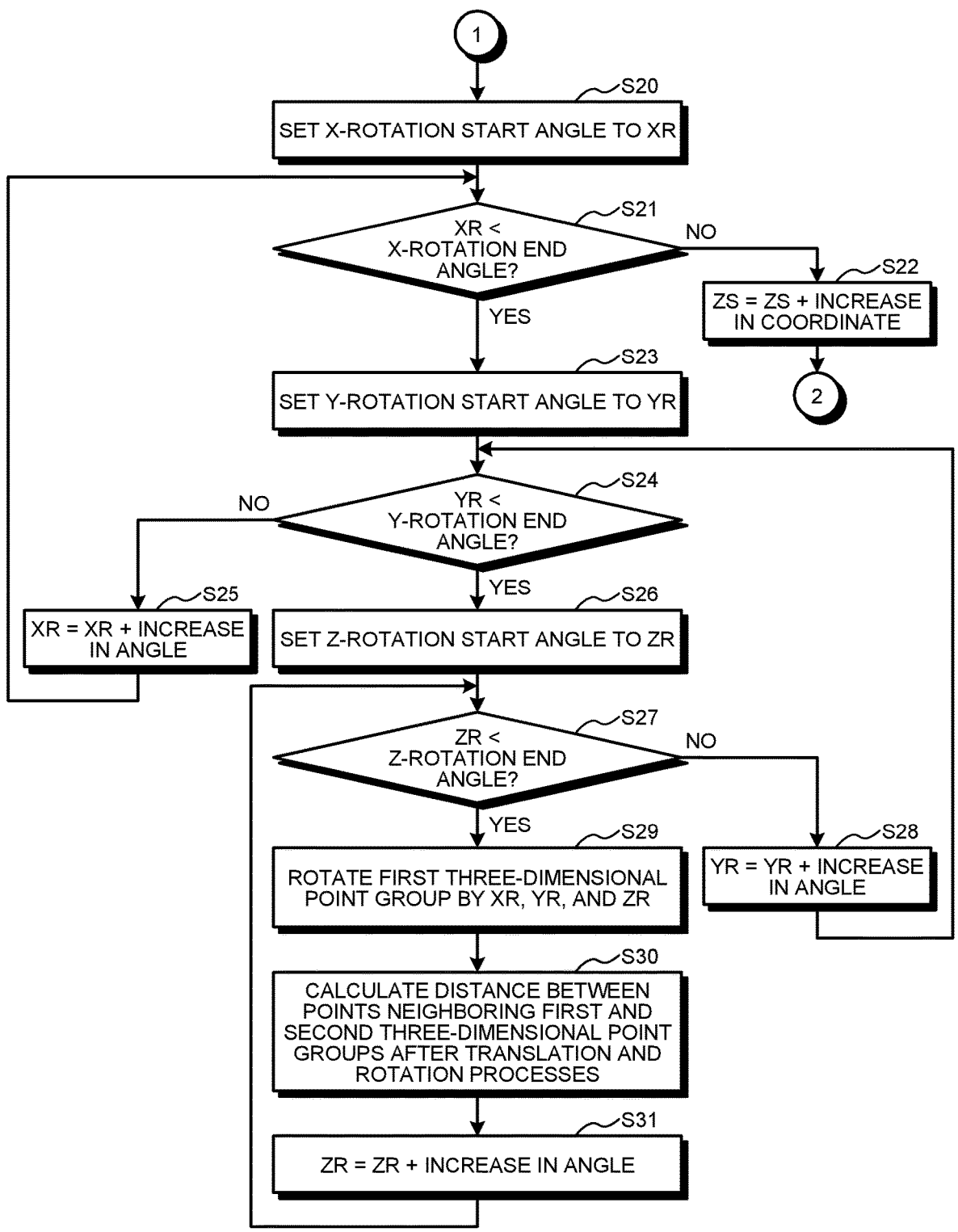
FIG. 35 is a (second) flowchart illustrating the example of the process procedure by the conventional device using ICP.

As described with reference to FIGS. 6 and 7, the information processing device 100 executes the process of executing the alignment in the translation direction only once. Therefore, the information processing device 100 can reduce a processing load caused by calculation of a translation parameter for the alignment. For example, as described using steps S10 to S22 illustrated in FIG. 34, since the conventional device executes a brute-force search while changing the translation value in an x axis direction, the translation value in a y axis direction, and the translation value in a z axis direction, the processing load caused by the calculation of the translation parameter is large.

After calculating the translation parameter, the information processing device 100 calculates an rotation parameter causing a distance between points neighboring the point groups to be smallest while changing rotational angles.

Figure 8:
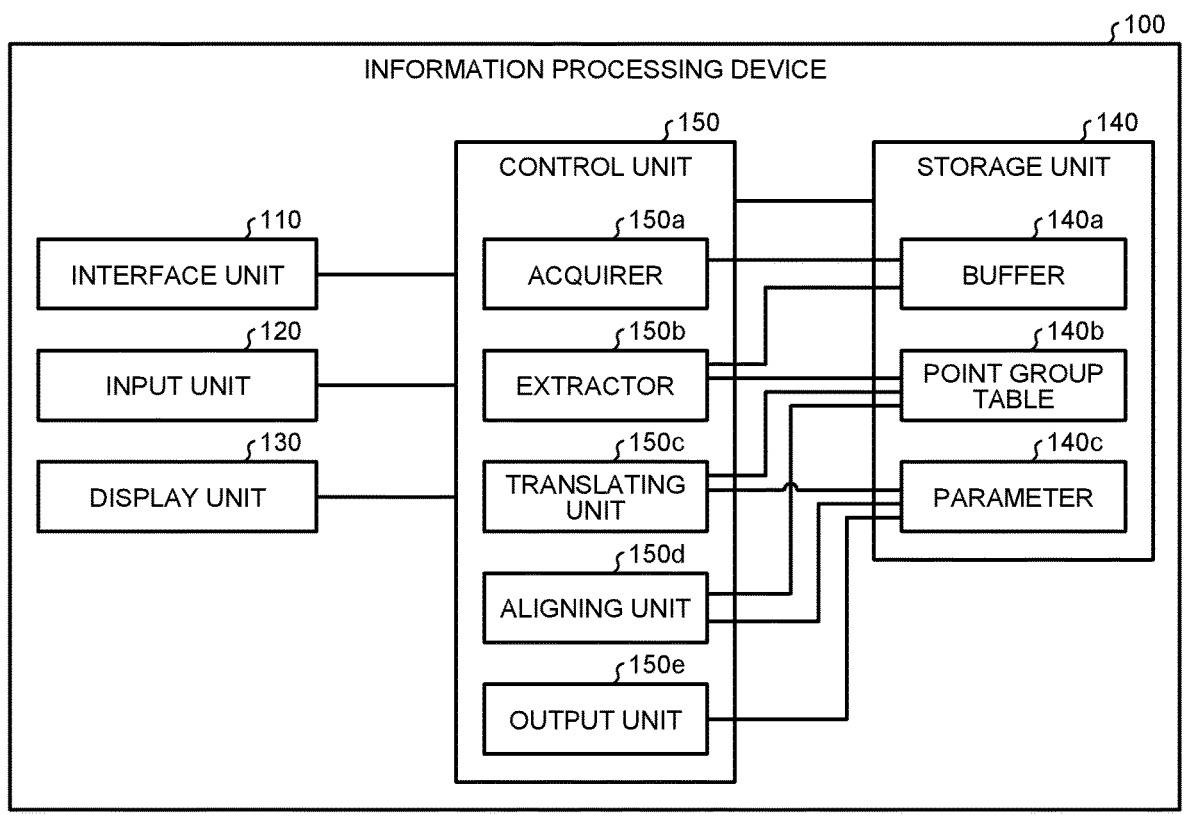
FIG. 8 is a functional block diagram illustrating a configuration of the information processing device according to the first embodiment.

FIG. 8 is a functional block diagram illustrating a configuration of the information processing device according to the first embodiment. As illustrated in FIG. 8, the information processing device 100 includes an interface unit 110, an input unit 120, a display unit 130, a storage unit 140, and a control unit 150.

The interface unit 110 is a communication device that receives information from the sensor 10a and the sensor 10b. The interface unit 110 receives the first background frame from the sensor 10a and receives the second background frame from the sensor 10b. The interface unit 110 chronologically receives the first distance image frames from the sensor 10a. The interface unit 110 chronologically receives the second distance image frames from the sensor 10b. The interface unit 110 outputs the first background frame, the second background frame, the first distance image frames, and the second distance image frames to the control unit 150.

In addition, the interface unit 110 is coupled to a scoring device described later.

The input unit 120 is an input device for inputting various information to the information processing device 100. For example, the input unit 120 corresponds to a keyboard, a mouse, a touch panel, or the like.

The display unit 130 is a display device that displays various information output from the control unit 150. For example, the display unit 130 corresponds to a liquid crystal display, a touch panel, or the like.

The storage unit 140 includes a buffer 140a, a point group table 140b, and a parameter 140c. The storage unit 140 corresponds to a semiconductor memory, such as a random access memory (RAM), a read only memory (ROM), or a flash memory, or a storage device, such as a hard disk drive (HDD).

The buffer 140a stores the first background frame received from the sensor 10a and the plurality of first distance image frames at the times. The buffer 140a also stores the second background frame received from the sensor 10b and the plurality of second distance image frames at the times.

Figure 9:
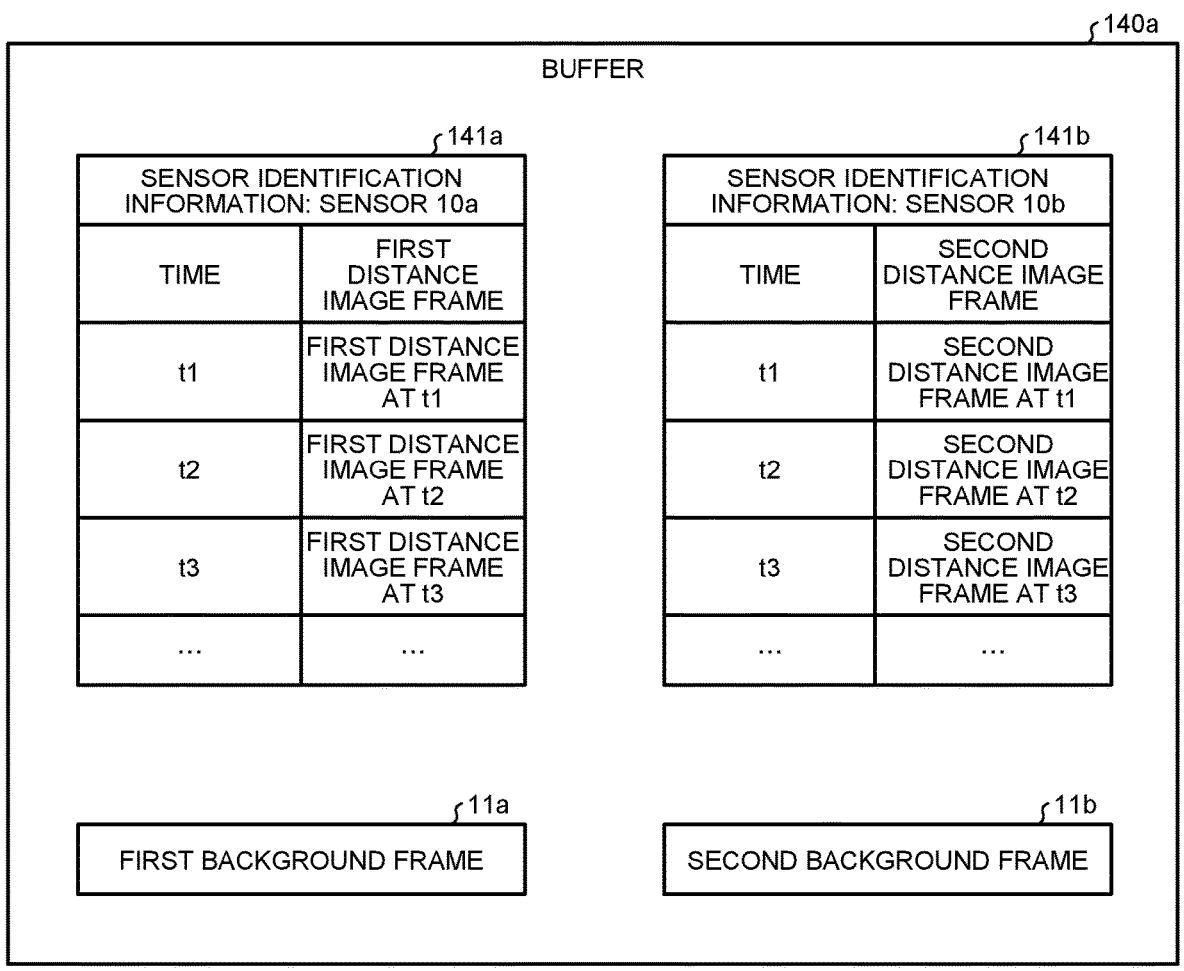
FIG. 9 is a diagram illustrating an example of a data structure of a buffer according to the first embodiment.

FIG. 9 is a diagram illustrating an example of a data structure of the buffer according to the first embodiment. As illustrated in FIG. 9, the buffer 140a has a table 141a, a table 141b, the first background frame 11a, and the second background frame 11b.

The table 141a is a table storing the first distance image frames received from the sensor 10a. As illustrated in FIG. 9, the table 141a associates the times with the first distance image frames.

The table 141b is a table storing the second distance image frames received from the sensor 10b. As illustrated in FIG. 9, the table 141b associates the times with the second distance image frames.

The first background frame 11a is a first distance image frame measured by the sensor 10a when the object 1 does not exist. The second background frame 11b is a second distance image frame measured by the sensor 10b when the object 1 does not exist.

The point group table 140b is a table storing coordinates of a point group on the object 1 measured by the sensor 10a and coordinates of a point group on the object 1 measured by the sensor 10b. FIG. 10 is a diagram illustrating an example of a data structure of the point group table according to the first embodiment. As illustrated in FIG. 10, the point group table 140b includes a table 142a and a table 142b.

The table 142a is a table holding the coordinates of the point group on the object 1 measured by the sensor 10a. In the following description, the point group on the object 1 measured by the sensor 10a is referred to as a point group 10A. As illustrated in FIG. 10, the table 142a associates the times with coordinate information of the point group 10A. The times indicate the times when the corresponding point group 10A is measured. The coordinate information of the point group 10A indicates three-dimensional coordinates of points included in the point group 10A.

The table 142b is a table holding the coordinates of the point group on the object 1 measured by the sensor 10b. In the following description, the point group on the object 1 measured by the sensor 10b is referred to as a point group 10B. As illustrated in FIG. 10, the table 142b associates the times with coordinate information of the point group 10B. The times indicate the times when the point group 10B is measured. The coordinate information of the point group 10B indicates three-dimensional coordinates of points included in the point group 10B.

FIG. 11 is a diagram describing an example of the coordinate information of the point group. FIG. 11 describes an example of the coordinate information of the point group 10A. A data structure of the coordinate information of the point group 10B is the same as or similar to a data structure of the coordinate information of the point group 10A, and a description thereof is omitted. In addition, coordinates of the point group 10A illustrated in FIG. 11 indicate coordinates of the point group 10A corresponding to a certain time. A description about coordinates of the point group 10A corresponding to the other times is omitted.

As illustrated in FIG. 11, the coordinates of the point group 10A are associated with point identification information and coordinate information. The point identification information is information uniquely identifying the points included in the point group 10A. The coordinates indicate the three-dimensional coordinates of the point group.

Return to the description of FIG. 8. The parameter 140c includes translation parameters and rotation parameters that lead to results of aligning the point groups 10A and 10B. FIG. 12 is a diagram illustrating an example of a data structure of the parameter according to the first embodiment. As illustrated in FIG. 12, the parameter 140c includes a table 143a and a table 143b.

The table 143a is a table holding the translation parameter of the sensor 10a and the rotation parameter of the sensor 10a. The translation parameter of the sensor 10a includes an X-translation distance, a Y-translation distance, and a Z-translation distance. The rotation parameter of the sensor 10a includes an X-rotation angle, a Y-rotation angle, and a Z-rotation angle.

The table 143b is a table holding the translation parameter of the sensor 10b and the rotation parameter of the sensor 10b. The translation parameter of the sensor 10b includes an X-translation distance, a Y-translation distance, and a Z-translation distance. The rotation parameter of the sensor 10b includes an X-rotation angle, a Y-rotation angle, and a Z-rotation angle.

For example, by correcting the coordinates of the point group 10A with the translation parameter of the table 143a and the rotation parameter of the table 143a and correcting the coordinates of the point group 10B with the translation parameter of the table 143b and the rotation parameter of the table 143b, the coordinates of the point group 10A and the coordinates of the point group 10B match.

The control unit 150 includes an acquirer 150a, an extractor 150b, a translating unit 150c, an aligning unit 150d, and an output unit 150e. The control unit 150 can be implemented by a central processing unit (CPU), a micro processing unit (MPU), or the like. The control unit 150 can be also implemented by hard wired logic, such as an application specific integrated circuit (ASIC) or a field programmable gate array (FPGA).

The acquirer 150a is a processing unit that acquires information from the sensors 10a and 10b. For example, the acquirer 150a causes the chronological first distance image frames acquired from the sensor 10a to be stored in the table 141a of the buffer 140a. The acquirer 150a causes the first background frame 11a acquired from the sensor 10a to be stored in the buffer 140a. The acquirer 150a causes the chronological second distance image frames acquired from the sensor 10b to be stored in the table 141b of the buffer 140a. The acquirer 150a causes the second background frame 11b acquired from the sensor 10b to be stored in the buffer 140a.

The extractor 150b is a processing unit that extracts the point groups 10A and 10B corresponding to the object 1 from the first and the second distance image frames stored in the buffer 140a. The extractor 150b causes information of the point groups 10A and 10B to be stored in the point group table 140b.

An example of a process of extracting the point group 10A by the extractor 150b is described. FIG. 13 is a diagram describing the process by the extractor according to the first embodiment. The extractor 150b acquires the first distance image frame 21a at the time to from the table 141a of the buffer 140a. The extractor 150b acquires the first background frame 11a from the buffer 140a. The extractor 150b generates a first differential frame 31a from a difference between the first distance image frame 21a and the first background frame 11a. In the first differential frame 31a, a region 32a of the object 1 remains.

The extractor 150b extracts, from the first differential frame 31a, the point group 10A as illustrated in FIG. 14. FIG. 14 is a diagram illustrating an example of the point group 10A. For example, the extractor 150b calculates, based on distance information of points on the region 32a of the first differential frame 31a and the parameters of the sensor 10a, three-dimensional coordinates of the points. The extractor 150b repeatedly executes the foregoing process on each of the points of the region 32a to calculate three-dimensional coordinates of the point group constituting the object 1 and extract the point group 10A. The extractor 150b causes coordinate information of the point group 10A at the time tn to be stored in the table 142a. The extractor 150b extracts coordinate information of the point group 10A at the other times in the same manner and causes the coordinate information of the point group 10A at the other times to be stored in the table 142a.

An example of a process of extracting the point group 10B by the extractor 150b is described. The extractor 150b acquires the second distance image frame 21b at the time tn from the table 141b of the buffer 140a. The extractor 150b acquires the second background frame 11b from the buffer 140a. The extractor 150b generates a second differential frame 31b from a difference between the second distance image frame 21b and the second background frame 11b. In the second differential frame 31b, a region 32b of the object 1 remains. An illustration of the second differential frame 31b and the region 32b is omitted.

The extractor 150b extracts, from the first differential frame 31a, the point group 10B as illustrated in FIG. 15. FIG. 15 is a diagram illustrating an example of the point group 10B. For example, the extractor 150b calculates, based on distance information of points on the region 32b of the second differential frame 31b and the parameters of the sensor 10b, three-dimensional coordinates of the points. The extractor 150b repeatedly executes the foregoing process on each of the points of the region 32b to calculate three-dimensional coordinates of the point group constituting the object 1 and extracts the point group 10B. The extractor 150b causes coordinate information of the point group 10B at the time to to be stored in the table 142b. The extractor 150b extracts coordinate information of the point group 10B at the other times in the same manner and causes the coordinate information of the point group 10B at the other times to be stored in the table 142b.

Return to the description of FIG. 8. The translating unit 150c is a processing unit that executes the alignment in the translation direction by moving the origin coordinates of the sensor 10a to the average coordinates 1A of the point group 10A and moving the origin coordinates of the sensor 10b to the average coordinates 1B of the point group 10B. The translating unit 150c causes the translation parameter corresponding to the sensor 10a to be stored in the table 143a. The translating unit 150c causes the translation parameter corresponding to the sensor 10b to be stored in the table 143b.

Figure 16:
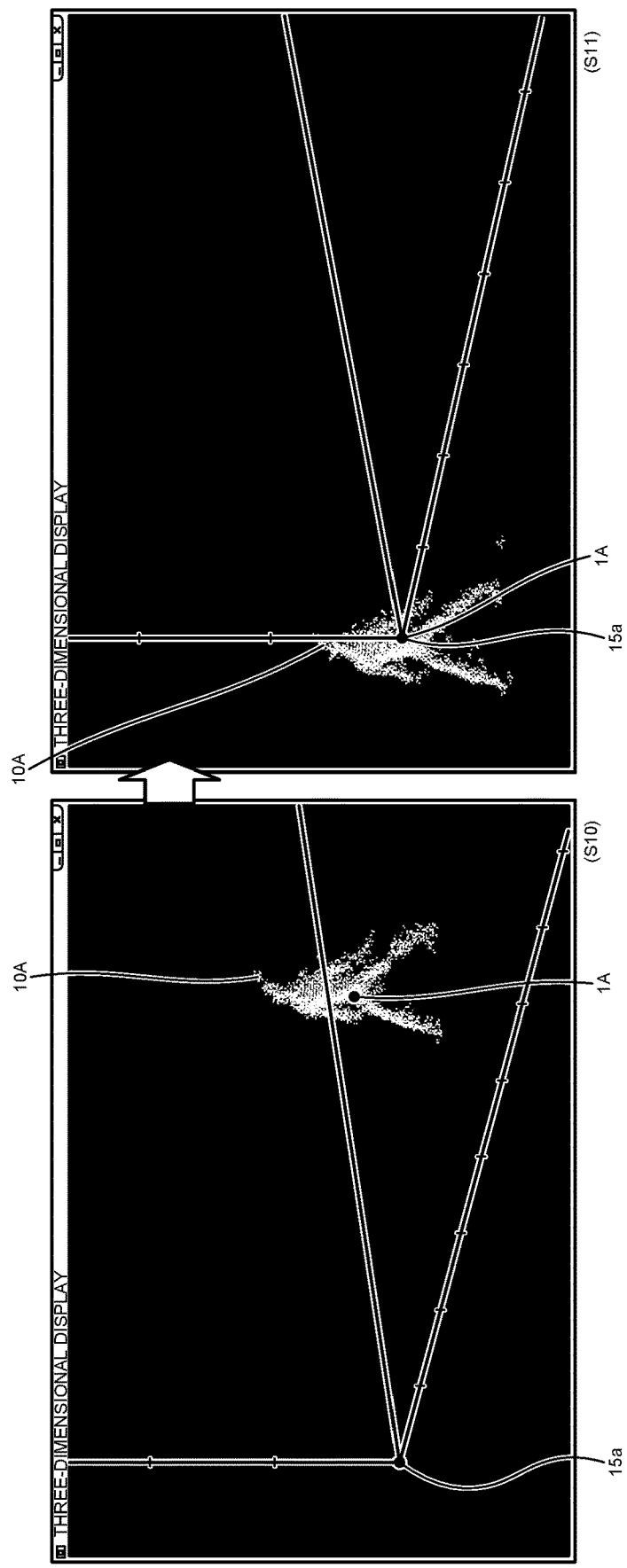
FIG. 16 is a diagram describing a process of translating the point group 10A.

FIG. 16 is a diagram describing a process of translating the point group 10A. In FIG. 16, the origin coordinates of the sensor 10a are the origin coordinates 15a. The translating unit 150c acquires the coordinate information of the point group 10A at the time to from the table 142a and calculates the average coordinates 1A of the point group 10A (step S10).

Subsequently, the translating unit 150c moves the average coordinates 1A to the origin coordinates 15a of the sensor 10a (step S11). The translation parameter to be used to translate (move) the average coordinates 1A toward the origin coordinates 15a includes the X-translation distance, the Y-translation distance, and the Z-translation distance. The X-translation distance indicates a translation value in the x axis direction. The Y-translation distance indicates a translation value in the y axis direction. The Z-translation distance indicates a translation value in the z axis direction. For example, it is assumed that the X-translation distance, the Y-translation distance, and the Z-translation distance that are used to move the average coordinates 1A to the origin coordinates 15a of the sensor 10a are XSa, YSa, and ZSa. The translating unit 150c causes the translation parameter related to the sensor 10a to be stored in the table 143a.

Figure 17:
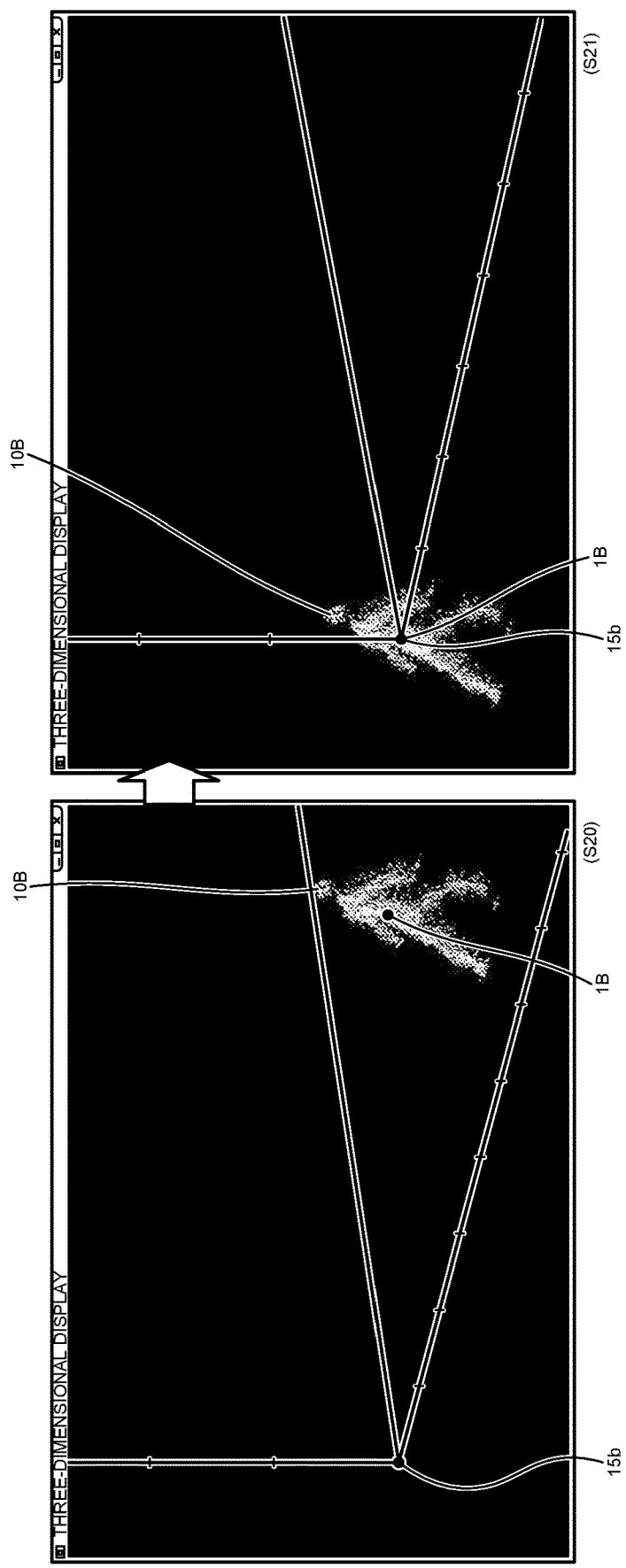
FIG. 17 is a diagram describing a process of translating the point group 10B.

FIG. 17 is a diagram describing a process of translating the point group 10B. In FIG. 17, the origin coordinates of the sensor 10b are the origin coordinates 15b. The translating unit 150c acquires the coordinate information of the point group 10B at the time to from the table 142b and calculates the average coordinates 1B of the point group 10B (step S20).

Subsequently, the translating unit 150c moves the average coordinates 1B to the origin coordinates 15b of the sensor 10b (step S21). The translation parameter to be used to translate (move) the average coordinates 1B toward the origin coordinates 15b includes the X-translation distance, the Y-translation distance, and the Z-translation distance. For example, the X-translation distance, the Y-translation distance, and the Z-translation distance that are used to move the average coordinates 1B to the origin coordinates 15b of the sensor 10b are XSb, YSb, and ZSb. The translating unit 150c causes the translation parameter related to the sensor 10b to be stored in the table 143b.

As described using step S11 illustrated in FIG. 16, the translating unit 150c outputs, to the aligning unit 150d, information of the point group 10A translated by the X-translation distance, the Y-translation distance, and the Z-translation distance. As described using step S21 illustrated in FIG. 17, the translating unit 150c outputs, to the aligning unit 150d, information of the point group 10B translated by the X-translation distance, the Y-translation distance, and the Z-translation distance.

Figure 18:
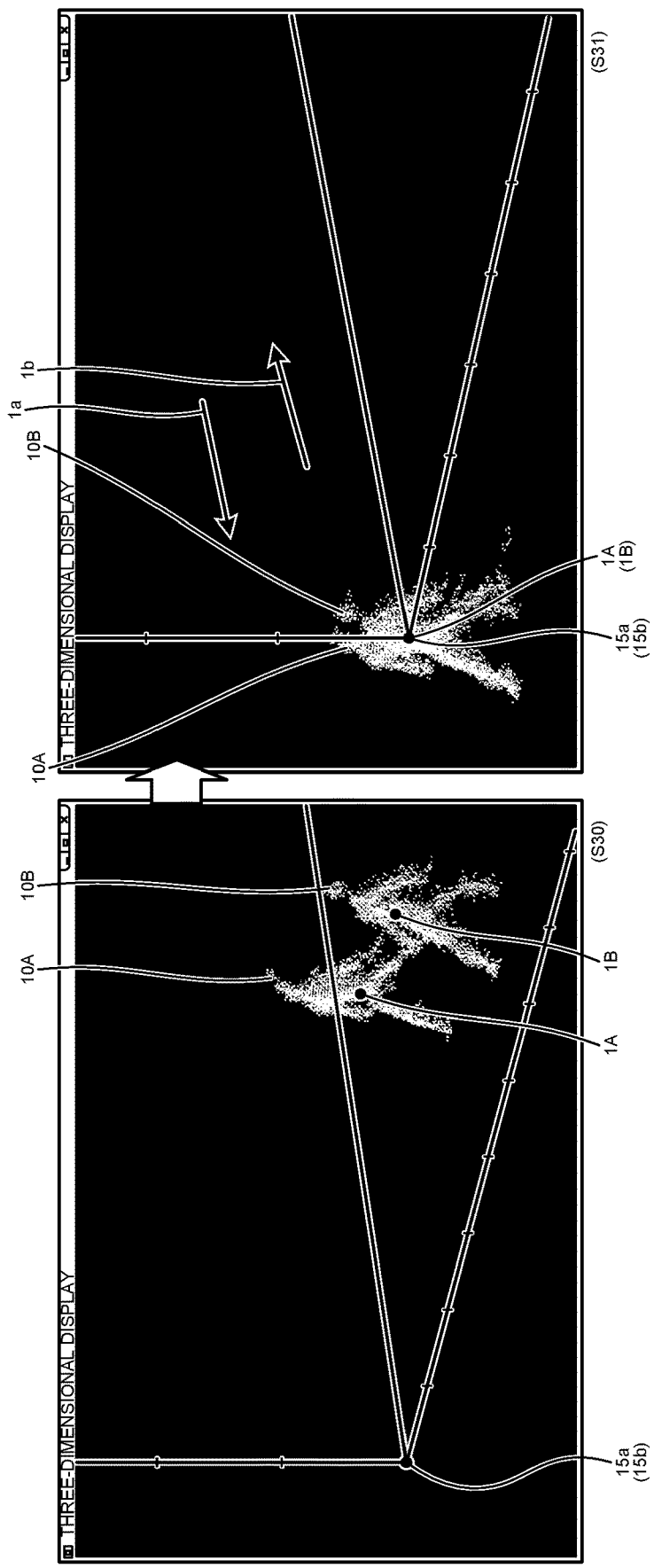
FIG. 18 is a diagram describing the point group before translation and the point group after the translation.

FIG. 18 is a diagram describing the point group before the translation and the point group after the translation. At step S30 illustrated in FIG. 18, before the translation, the translation direction of the point group 10A does not match the translation direction of the point group 10B. As indicated by step S31, the translating unit 150c completes the alignment of the point groups 10A and 10B in the translation direction by moving the point group 10A to the origin coordinates 15a and moving the point group 10B to the origin coordinates 15b. In FIG. 18, an arrow 1a indicates the orientation (movement direction) of the object 1 viewed from the sensor 10a and an arrow 1b indicates the orientation (movement direction) of the object 1 viewed from the sensor 10b.

The aligning unit 150d is a processing unit that calculates the rotation parameters to be used to align the point group 10A and the point group 10B. Each of the rotation parameters includes an X-rotation angle, a Y-rotation angle, and a Z-rotation angle. For example, the X-rotation angle indicates a rotational angle (roll) about the x axis. The Y-rotation angle indicates a rotational angle (pitch) about the y axis. The Z-rotation angle indicates a rotational angle (yaw) about the z axis. It is assumed that the alignment of the point groups 10A and 10B in the translation direction is already completed by the translating unit 150c.

The aligning unit 150d executes the alignment in a rotational direction by calculating the rotation parameter causing a distance between points neighboring the point groups 10A and 10B to be smallest, while fixing the rotation of the point group 10B and rotating the point group 10A.

Figure 19:
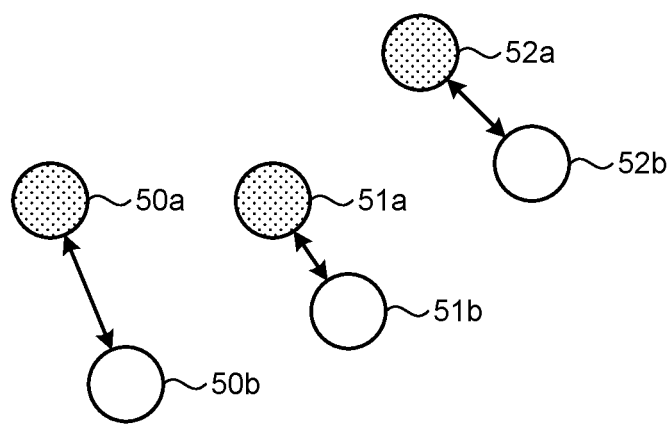
FIG. 19 is a diagram describing a process by an aligning unit according to the first embodiment.

FIG. 19 is a diagram describing a process by the aligning unit according to the first embodiment. In FIG. 19, points included in the point group 10A are points 50a, 51a, and 52a, and points included in the point groups 10B are points 50b, 51b, and 52b. A point neighboring the point 50a is the point 50b. A point neighboring the point 51a is the point 51b. A point neighboring the point 52a is the point 52b. The aligning unit 150d calculates a total distance by summing distances between the pairs of points neighboring each other.

In the example illustrated in FIG. 19, a value obtained by summing the distance between the point 50a and the point 50b, the distance between the point 51a and the point 51b, and the distance between the point 52a and 52b is the total distance. The aligning unit 150d repeatedly executes a process of calculating the total distance corresponding to the rotation parameter while changing the rotation parameter. The aligning unit 150d executes the alignment in the rotational direction by calculating the rotation parameter causing the total distance to be smallest.

Figure 20:
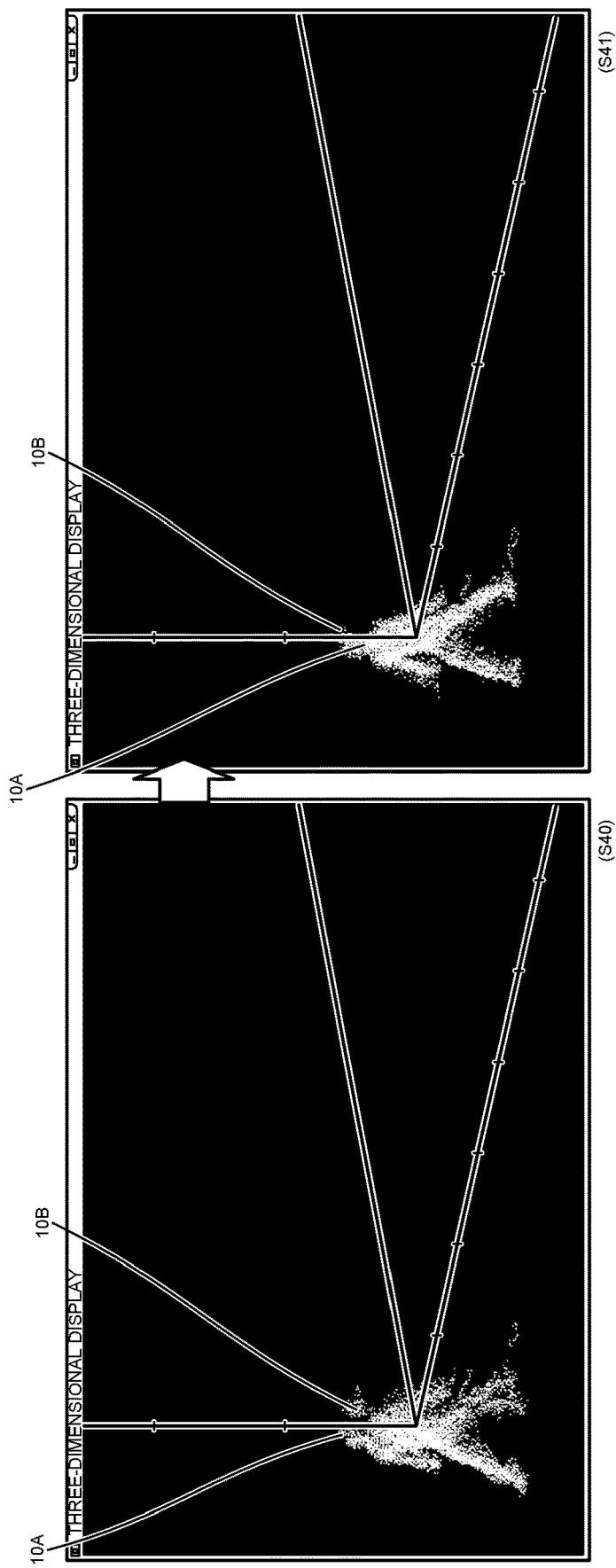
FIG. 20 is a diagram illustrating an example of the point groups before and after the completion of alignment in a rotational direction.

FIG. 20 is a diagram illustrating an example of the point groups before and after the completion of the alignment in the rotational direction. At step S40, the alignment of the point groups 10A and 10B in the translation direction is already completed, but the alignment of the point groups 10A and 10B in the rotational direction is not completed. At step S41, the aligning unit 150d completes the alignment of the point groups 10A and 10B by rotating the point group 10A based on the rotation parameter causing the total distance to be smallest.

The aligning unit 150d causes the rotation parameter (rotation parameter of the sensor 10a) causing the total distance to be smallest to be stored in the table 143a. In addition, the aligning unit 150d causes the rotation parameter of the sensor 10b to be stored in the table 143b. Since the alignment is executed while fixing the rotation of the point group 10B, the rotation parameter (X-rotation angle, Y-rotation angle, and Z-rotation angle) of the sensor 10b is "0".

The aligning unit 150d may calculate the translation parameters, instead of the translating unit 150c. For example, the aligning unit 150d calculates the translation parameter of the sensor 10a by calculating a difference between the average coordinates 1A of the point group 10A before the translation and the origin coordinates 15a of the sensor 10a. The aligning unit 150d calculates the translation parameter of the sensor 10b by calculating a difference between the average coordinates 1B of the point group 10B before the translation and the origin coordinates 15b of the sensor 10b.

The output unit 150e is a processing unit that outputs the parameter 140c to the scoring device.

Figure 21:
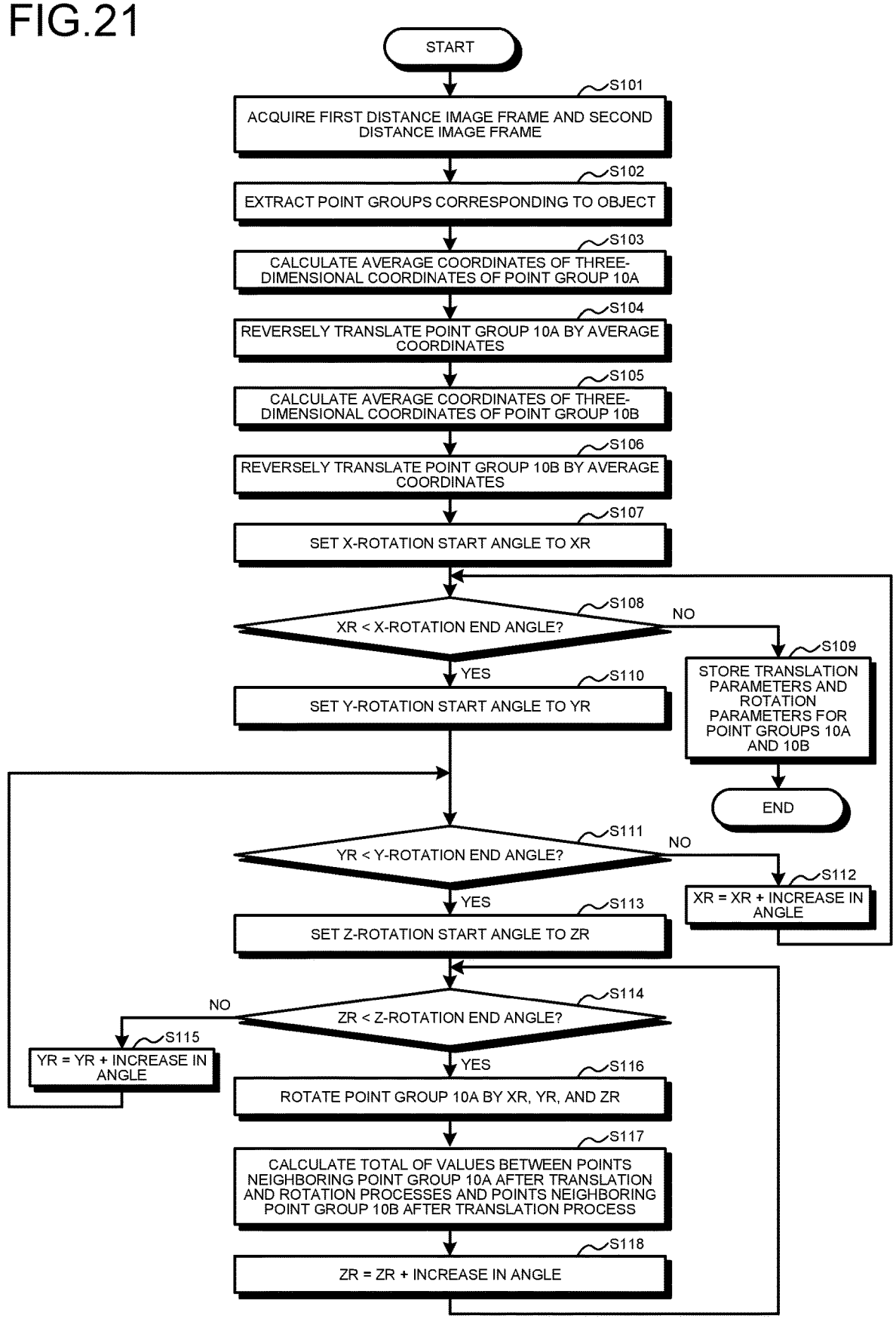
FIG. 21 is a flowchart illustrating a process procedure by the information processing device according to the first embodiment.

Next, an example of a process procedure by the information processing device 100 according to the first embodiment is described. FIG. 21 is a flowchart illustrating the process procedure by the information processing device according to the first embodiment. As illustrated in FIG. 21, the acquirer 150a of the information processing device 100 acquires the first distance image frames and the second distance image frames from the sensor 10a and the sensor 10b (step S101).

The extractor 150b of the information processing device 100 extracts the point groups 10A and 10B corresponding to the object (step S102). The translating unit 150c of the information processing device 100 calculates the average coordinates of the three-dimensional coordinates of the point group 10A (step S103). The translating unit 150c reversely translates the point group 10A by the average coordinates (step S104).

The translating unit 150c calculates the average coordinates of the three-dimensional coordinates of the point group 10B (step S105). The translating unit 150c reversely translates the point group 10B by the average coordinates (step S106).

The aligning unit 150d of the information processing device 100 sets an X-rotation start angle to XR (step S107). The aligning unit 150d determines whether XR is less than an X-rotation end angle (step S108). When XR is not less than the X-rotation end angle (No at step S108), the aligning unit 150d causes the translation parameters for the point groups 10A and 10B and the rotation parameters for the point groups 10A and 10B to be stored in the parameter 140c (step S109).

When XR is less than the X-rotation end angle (Yes at step S108), the aligning unit 150d sets a Y-rotation start angle to YR (step S110). The aligning unit 150d determines whether YR is less than a Y-rotation end angle (step S111). When YR is not less than the Y-rotation end angle (No at step S111), the aligning unit 150d updates XR using a value obtained by adding an increase in the angle to XR (step S112) and causes the process to proceed to step S108.

When YR is less than the Y-rotation end angle (Yes at step S111), the aligning unit 150d sets a Z-rotation start angle to ZR (step S113). The aligning unit 150d determines whether ZR is less than a Z-rotation end angle (step S114). When ZR is not less than the Z-rotation end angle (No at step S114), the aligning unit 150d updates YR using a value obtained by adding an increase in the angle to YR (step S115) and causes the process to proceed to step S111.

When ZR is less than the Z-rotation end angle (Yes at step S114), the aligning unit 150d rotates the point group 10A by XR, YR, and ZR (step S116). The aligning unit 150d calculates the total of values between points neighboring the point group 10A after the translation and rotation processes and points neighboring the point group 10B after the translation process (step S117). The aligning unit 150d updates ZR using a value obtained by adding an increase in the angle to ZR (step S118) and causes the process to proceed to step S114.

Next, effects of the information processing device 100 according to the first embodiment are described. The information processing device 100 completes the alignment of the point groups 10A and 10B in the translation direction by translating the average coordinates 1A of the point group 10A to the origin coordinates 15a of the sensor 10a and translating the average coordinates 1B of the point group 10B to the origin coordinates 15b of the sensor 10b. After the completion of the alignment in the translation direction, the information processing device 100 calculates the rotation parameter causing the total of distances between the points neighboring the point groups 10A and 10B to be smallest, while fixing the rotation of the point group 10B and rotating the point group 10A.

As described above, since the information processing device 100 executes the alignment process in the translation direction only once, the information processing device 100 can reduce a processing load caused by the calculation of the translation parameters for the alignment, compared to the conventional device.

The information processing device 100 calculates the average coordinates 1A of the point group 10A and the average coordinates 1B of the point group 10B and executes the alignment in the translation direction. Since the processing load is small, the process of calculating the average coordinates enables a reduction in the processing load.

Subsequently, an example of the scoring device that uses the parameter 140c calculated by the information processing device 100 described in the first embodiment to score the performance of gymnasts is described. Although the scoring device is described, a device is not limited to the scoring device. When a device uses the plurality of sensors to sense an object, the device can use the parameter 140c calculated by the information processing device 100.

Figure 22:
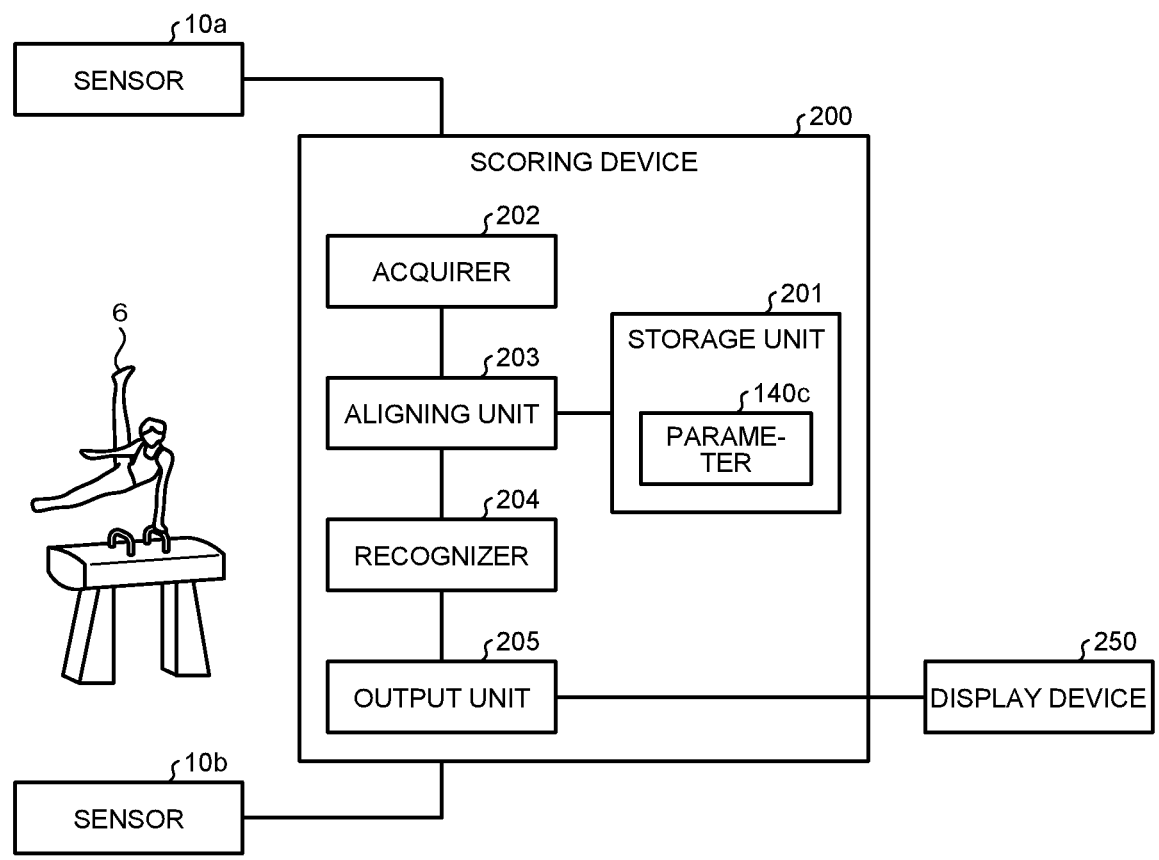
FIG. 22 is a functional block diagram illustrating a configuration of a scoring device.

FIG. 22 is a functional block diagram illustrating a configuration of the scoring device. As illustrated in FIG. 22, a scoring device 200 is coupled to the sensor 10a, the sensor 10b, and a display device 250. The sensor 10a and the sensor 10b correspond to the sensor 10a and the sensor 10b that are illustrated in FIG. 1. It is assumed that installation states of the sensors 10a and 10b illustrated in FIG. 22 are the same as the installation states of the sensors 10a and 10b illustrated in FIG. 1. The installation states indicate installation positions of the sensors 10a and 10b and the orientation of the sensors 10a and 10b.

The display device 250 displays information output from the scoring device. For example, the display device 250 corresponds to a liquid crystal display, a touch panel, or the like.

The scoring device 200 includes a storage unit 201, an acquirer 202, an aligning unit 203, a recognizer 204, and an output unit 205.

The storage unit 201 has the parameter 140c. The storage unit 201 corresponds to a semiconductor memory element, such as a RAM, a ROM, or a flash memory, or a storage device, such as an HDD. The parameter 140c is information corresponding to the parameter 140c described with reference to FIG. 8.

The acquirer 202 acquires a first distance image frame from the sensor 10a and acquires a second distance image frame from the sensor 10b. The acquirer 202 extracts a first point group included in the first distance image frame and constituting an object 6 based on the first distance image frame and a first background frame. The acquirer 202 extracts a second point group included in the second distance image frame and constituting the object 6 based on the second distance image frame and a second background frame. The acquirer 202 outputs coordinate information of the first point group and coordinate information of the second point group to the aligning unit 203.

The aligning unit 203 is a processing unit that aligns the first point group with the second point group based on the parameter 140c. The aligning unit 203 aligns coordinates of each of points included in the first point group based on the translation parameter stored in the table 143a and the rotation parameter stored in the table 143a. The aligning unit 203 aligns coordinates of each of points included in the second point group based on the translation parameter stored in the table 143b and the rotation parameter stored in the table 143b. The aligning unit 203 outputs information of the aligned first and second point groups to the recognizer 204.

A recognizer 404 is a processing unit that integrates the aligned first point group with the aligned second point group and recognizes the skeleton of the object 6. The recognizer 404 detects the position of the skeleton of the object 6 at each of times, compares the transition of the position of the skeleton with a table (not illustrated) defining scoring criteria, and scores performance of the object 6. The recognizer 404 outputs information of the scoring result to the output unit 205. For example, the information of the scoring result includes a difficulty (D) score and an execution (E) score.

Figure 23:
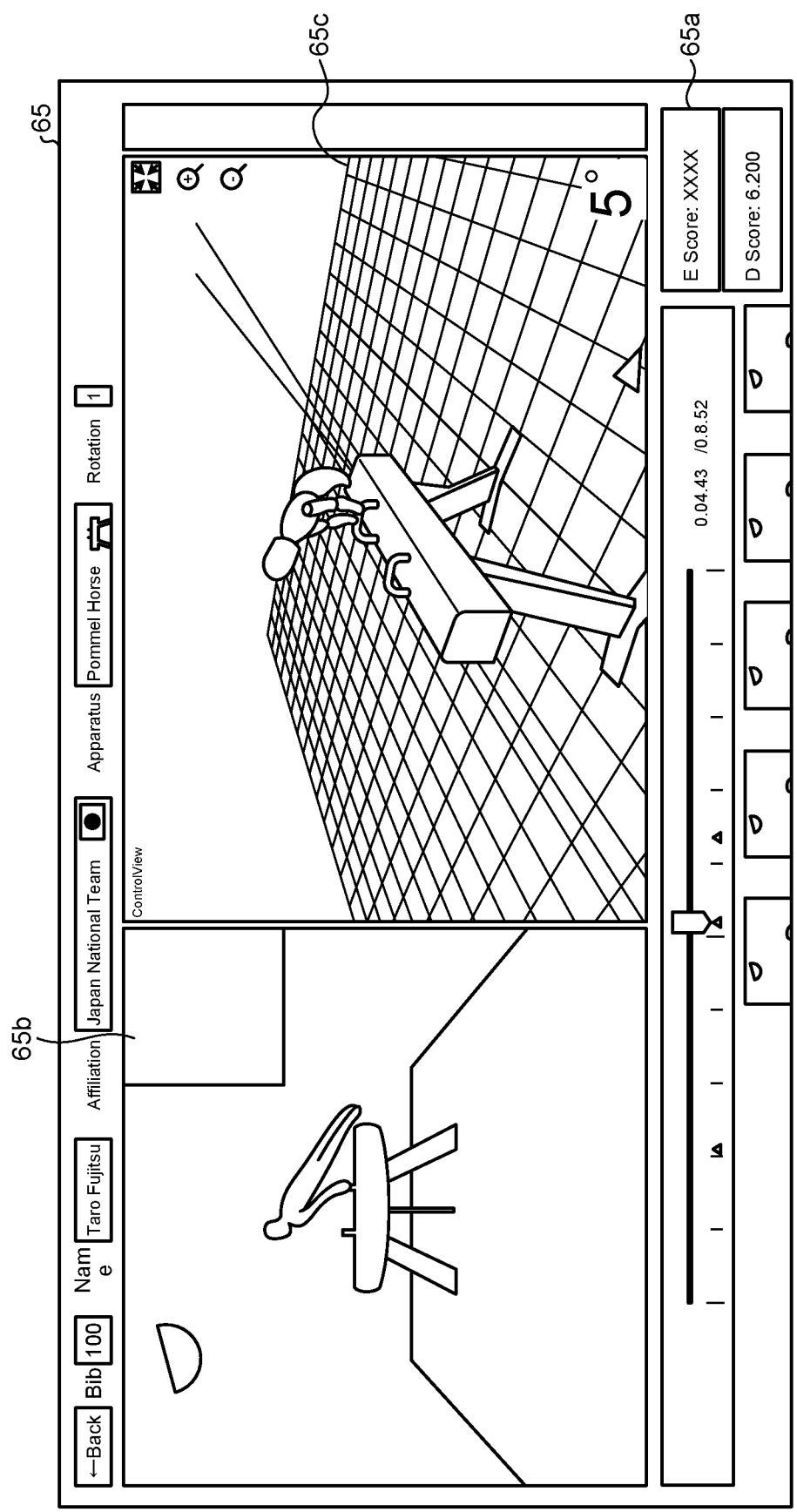
FIG. 23 is a diagram illustrating an example of a score screen.

The output unit 205 is a processing unit that generates scoring screen information based on the information of the scoring result. The output unit 205 outputs the scoring screen information to the display device 250 and causes the display device 250 to display the scoring screen information. FIG. 23 is a diagram illustrating an example of a scoring screen. As illustrated in FIG. 23, scoring screen information 65 includes regions 65a, 65b, and 65c.

The region 65a is a region for displaying scoring results, such as a D score and an E score. The region 65b is a region for displaying a video image of the object 6 imaged by the camera or the like. The region 65c is a region for displaying a 3D model estimated based on information of the skeleton estimated from the aligned first point group and the aligned second point group.

Figure 24:
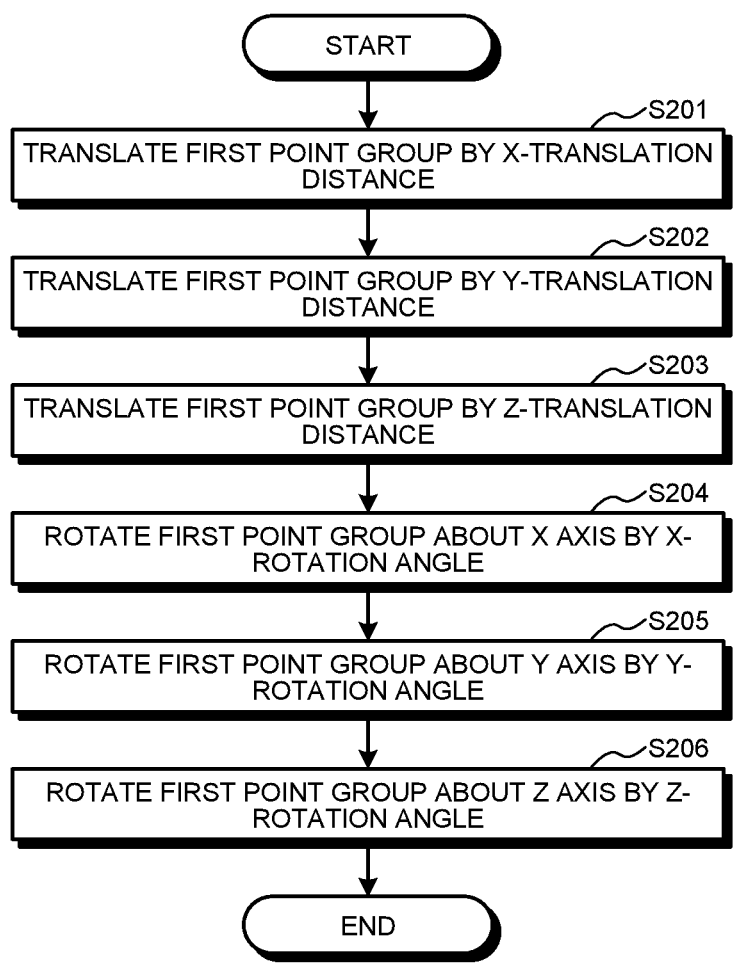
FIG. 24 is a flowchart illustrating a process procedure by an aligning unit of the scoring device.

Subsequently, an example of a process procedure by the aligning unit 203 of the scoring device 200 is described. FIG. 24 is a flowchart illustrating the process procedure by the aligning unit of the scoring device. The example illustrated in FIG. 24 describes the case where the first point group is aligned. The second point group, however, is aligned in the same manner as the first point group.

As illustrated in FIG. 24, the aligning unit 203 of the scoring device 200 translates the first point group by the X-translation distance (step S201). The aligning unit 203 translates the first point group by the Y-translation distance (step S202). The aligning unit 203 translates the first point group by the Z-translation distance (step S203).

The aligning unit 203 rotates the first point group about the X axis by the X-rotation angle (step S204). The aligning unit 203 rotates the first point group about the Y axis by the Y-rotation angle (step S205). The aligning unit 203 rotates the first point group about the Z axis by the Z-rotation angle (step S206).

Since the scoring device 200 aligns the point groups measured by the sensors 10a and 10b based on the parameter 140c generated by the information processing device 100 in the foregoing manner, the scoring device 200 can accurately identify the point groups of the entire object and improve the accuracy of the scoring.

[b] Second Embodiment

Next, an information processing device according to a second embodiment is described. The information processing device according to the second embodiment is coupled to the sensor 10a and the sensor 10b, like the first embodiment.

Figure 25:
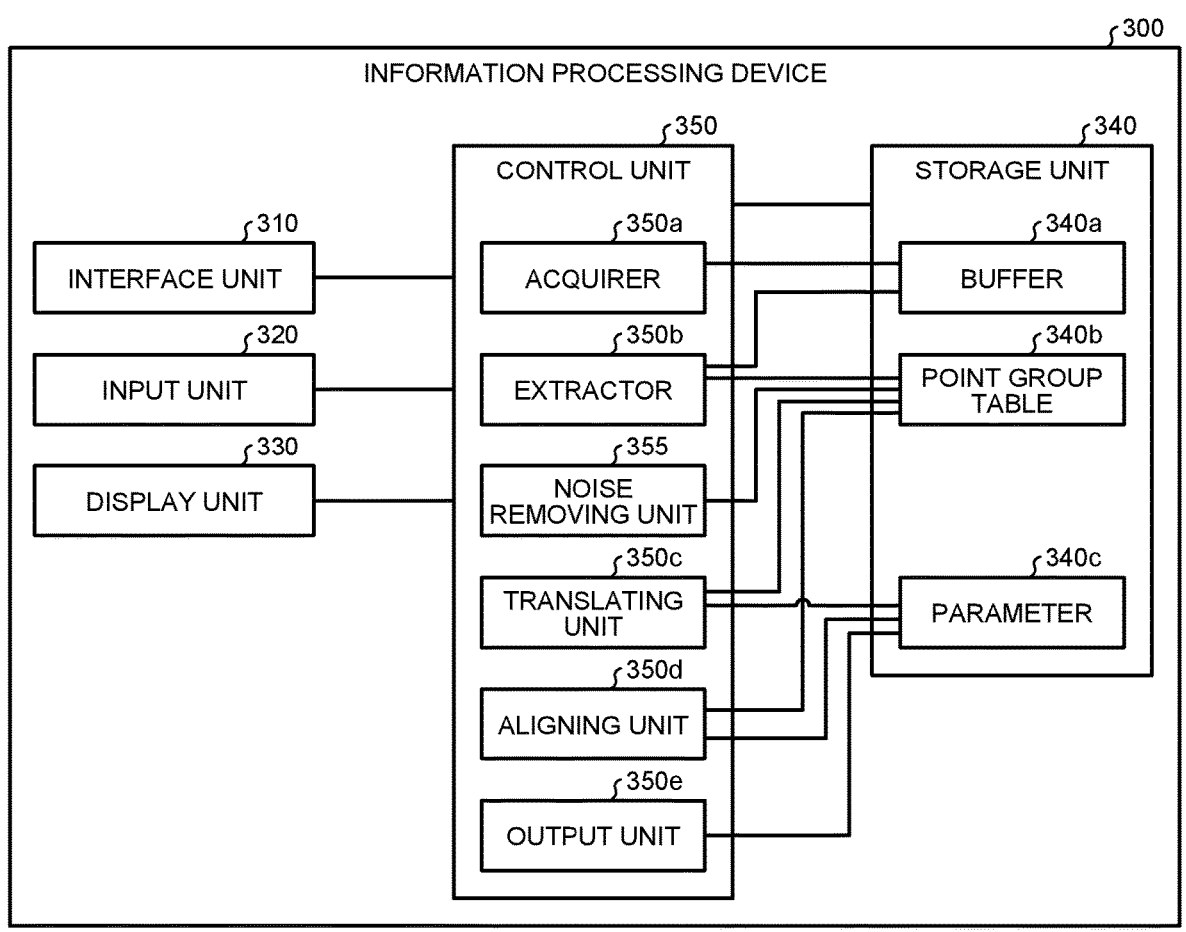
FIG. 25 is a functional block diagram illustrating a configuration of an information processing device according to a second embodiment.

FIG. 25 is a functional block diagram illustrating a configuration of the information processing device according to the second embodiment. As illustrated in FIG. 25, an information processing device 300 includes an interface unit 310, an input unit 320, a display unit 330, a storage unit 340, and a control unit 350.

A description about the interface unit 310, the input unit 320, and the display unit 330 is the same as or similar to the description about the interface unit 110, the input unit 120, and the display unit 130 that are illustrated in FIG. 8.

The storage unit 340 includes a buffer 340a, a point group table 340b, and a parameter 340c. The storage unit 340 corresponds to a semiconductor memory element, such as a RAM, a ROM, or a flash memory, or a storage device, such as an HDD.

A description about the buffer 340a, the point group table 340b, and the parameter 340c is the same as or similar to the description about the buffer 140a, the point group table 140b, and the parameter 140c that are illustrated in FIG. 8.

The control unit 350 includes an acquirer 350a, an extractor 350b, a noise removing unit 355, a translating unit 350c, an aligning unit 350d, and an output unit 350e. The control unit 350 can be implemented by a CPU, an MPU, or the like. The control unit 350 can be also implemented by hardware wired logic, such as an ASIC or an FPGA.

The acquirer 350a is a processing unit that acquires information from the sensors 10a and 10b. The acquirer 350a causes the acquired information to be stored in the buffer 340a. Another description about the acquirer 350a is the same as or similar to the description about the acquirer 150a illustrated in FIG. 8.

The extractor 350b is a processing unit that extracts the point groups 10A and 10B corresponding to the object from the first and the second distance image frames stored in the buffer 340a. The extractor 350b causes information of the point groups 10A and 10B to be stored in the point group table 340b. Another description about the extractor 350b is the same as or similar to the description about the extractor 150b illustrated in FIG. 8.

Figure 26:
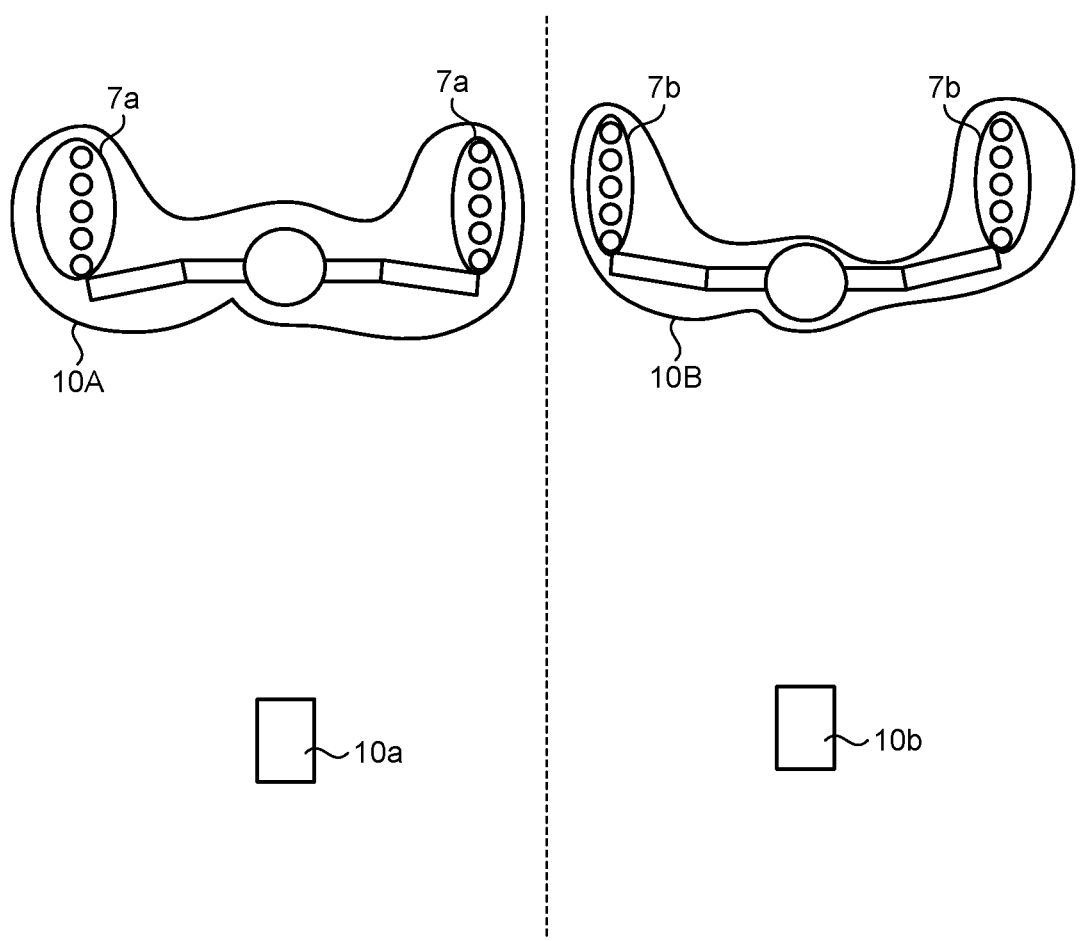
FIG. 26 is a diagram describing a process by a noise removing unit according to the second embodiment.

The noise removing unit 355 is a processing unit that removes edge noise included in the point groups 10A and 10B. FIG. 26 is a diagram describing a process by the noise removing unit according to the second embodiment. FIG. 26 illustrates a state in which the point groups 10A and 10B are viewed from above. For example, the point group 10A includes edge noise 7a on the side opposite to the sensor 10a. The point group 10B includes edge noise 7b on the side opposite to the sensor 10b.

The noise removing unit 355 removes the edge noise 7a from the point group 10A and removes information of points corresponding to the edge noise 7a from the point group table 340b. The noise removing unit 355 removes the edge noise 7b from the point group 10B and removes information of points corresponding to the edge noise 7b from the point group table 340b.

An example of a process of identifying the edge noise 7a included in the point group 10A by the noise removing unit 355 is described. The noise removing unit 355 selects a point included in the point group 10A and calculates the distance between the selected point and a point closest to the selected point. When the calculated distance is equal to or longer than a threshold, the noise removing unit 355 determines that the selected point is included in the edge noise 7a. The noise removing unit 355 executes the same process on other points included in the point group 10A and determines the edge noise 7a.

FIG. 27 is a diagram illustrating an example of the point group 10A before and after the edge noise removal. In FIG. 27, before the edge noise removal, at step S50, the edge noise 7a is included in the point group 10A. At step S51, the edge noise 7a is removed from the point group 10A.

An example of a process of identifying the edge noise 7b included in the point group 10B by the noise removing unit 355 is described. The noise removing unit 355 selects a point included in the point group 10B and calculates the distance between the selected point and a point closest to the selected point. When the calculated distance is equal to or longer than the threshold, the noise removing unit 355 determines that the selected point is included in the edge noise 7b. The noise removing unit 355 executes the same process on other points included in the point group 10B and determines the edge noise 7b.

FIG. 28 is a diagram illustrating an example of the point group 10B before and after the edge noise removal. In FIG. 28, before the edge noise removal, at step S60, the edge noise 7b is included in the point group 10B. At step S61, the edge noise 7b is removed from the point group 10B.

The translating unit 350c is a processing unit that executes alignment in a translation direction by moving the origin coordinates of the sensor 10a to the average coordinates 1A of the point group 10A and moving the origin coordinates of the sensor 10b to the average coordinates 1B of the point group 10B. Another description about the translating unit 350c is the same as or similar to the description about the translating unit 150c illustrated in FIG. 8.

The aligning unit 350d is a processing unit that calculates the rotation parameters to be used to align the point group 10A and the point group 10B. Another description about the aligning unit 350d is the same as or similar to the description about the aligning unit 150d illustrated in FIG. 8.

The output unit 350e is a processing unit that outputs the parameter 340c to the scoring device.

Next, effects of the information processing device 300 according to the second embodiment are described. The information processing device 300 removes the edge noise 7a from the point group 10A and removes the edge noise 7b from the point group 10B. Therefore, the alignment of the point groups 10A and 10B can be more accurately executed. For example, when the point group 10A and the point group 10B are rotated so that the position of the point group 10A matches the position of the point group 10B, and the edge noise 7a and 7b is not removed, appropriate neighboring points are not able to be selected and the rotation parameters causing the total distance to be smallest are not able to be identified with high accuracy. For example, even in a state in which the point group 10A is rotated by 180 degrees, removing the edge noise 7a and 7b can prevent the information processing device 300 from calculating, as a distance between neighboring points, a distance between a certain point of the edge noise 7a and a certain point of the point group 10B.

The process of removing noise by the noise removing unit 355 is not limited to the foregoing. For example, the noise removing unit 355 extracts, from the first background frame, a first region having a size equal to or larger than a predetermined size. The noise removing unit 355 identifies, from a region of points of a non-background of the first differential frame, a point group whose distance from the first region is shorter than a predetermined distance. Then, the noise removing unit 355 groups points included in the identified point group into groups of adjacent points whose distances from each other are short. The noise removing unit 355 removes, as edge noise, a point that is included in each of the groups of the points grouped and is within a region that includes a point included in the group and is smaller than a threshold.

The noise removing unit 355 extracts, from the second background frame, a second region having a size equal to or larger than the predetermined size. The noise removing unit 355 identifies, from a region of points of a non-background of the second differential frame, a point group whose distance from the second region is shorter than the predetermined distance. Then, the noise removing unit 355 groups points included in the identified point group into groups of adjacent points whose distances from each other are short. The noise removing unit 355 removes, as edge noise, a point that is included in each of the groups of the points grouped and is within a region that includes a point included in the group and is smaller than the threshold.

[c] Third Embodiment

Figure 29:
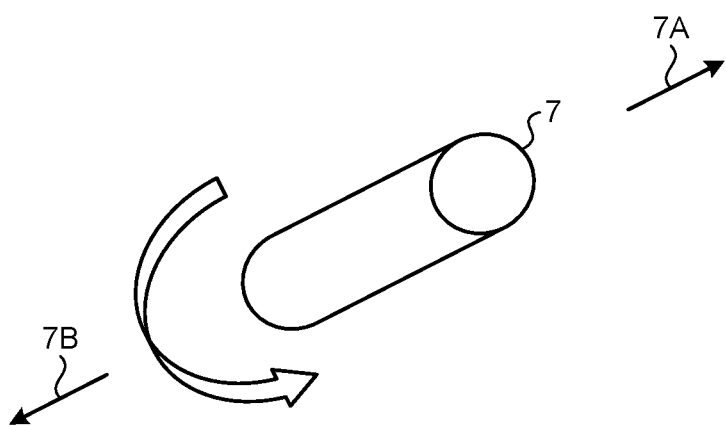
FIG. 29 is a diagram describing an example of characteristics of the posture of a competing athlete.

FIG. 29 is a diagram describing an example of characteristics of the posture of a competing athlete. For example, in vault and floor exercises in gymnastics, while an athlete 7 is in midair, the athlete 7 is in an upright position with both legs closed and both arms put on the athlete's chest in some cases. When the object (athlete 7) is detected in the foregoing state, a cylinder-like shape is obtained and a difference between a direction 7A and a direction 7B is small. In addition, even when the cylinder (athlete 7) is rotated about a central axis in a longitudinal direction of the cylinder (athlete 7) many times, a difference between radius directions is small and thus it is difficult to determine whether the alignment has been completed. For example, when each of the information processing devices 100 and 300 aligns the point group 10A with the point group 10B while treating the athlete 7 as an object, the alignment of the entire point groups is not likely to be completed.

An information processing device according to the third embodiment selects a plurality of distance image frames for a time period from the time when the athlete starts jumping to the time when the athlete lands. Then the information processing device according to the third embodiment uses a point group obtained by integrating point groups included in the distance image frames.

Figure 30:
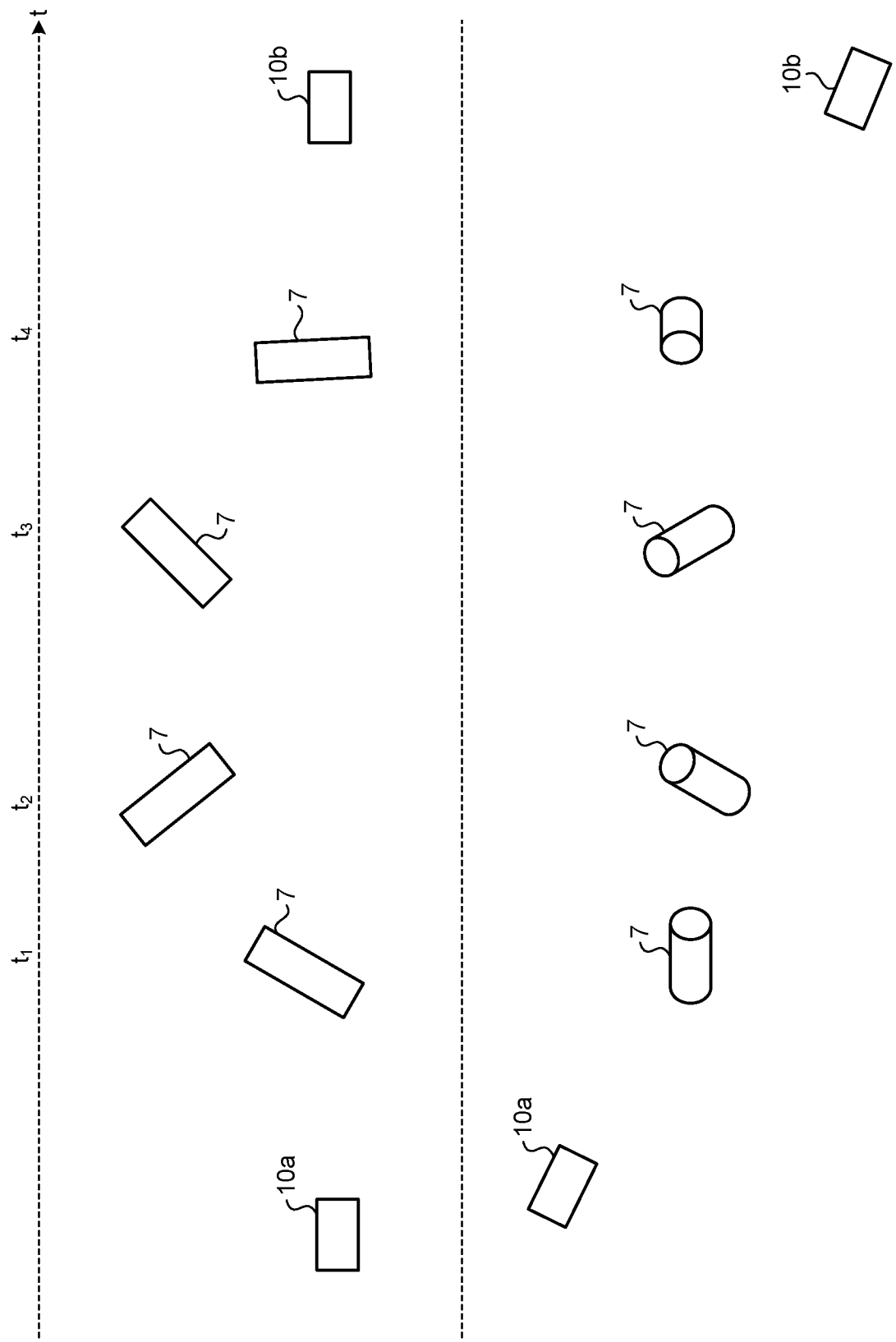
FIG. 30 is a diagram describing a process by an information processing device according to a third embodiment.

FIG. 30 is a diagram describing a process by the information processing device according to the third embodiment. The upper side of FIG. 30 illustrates a state in which the athlete 7 is viewed from the side at each of times. The lower side of FIG. 30 illustrates a state in which the athlete 7 is viewed from above at each of the times. For example, the athlete 7 starts jumping at a time t1 and is in midair at times t2 and t3 and lands at the time t4.

For example, the information processing device integrates point groups extracted from the first distance image frames at the times t1, t2, and t3 into the point group 10A. The information processing device integrates point groups extracted from the second distance image frames at the times t1, t2, and t3 into the point group 10B. Since the point groups at the times are integrated, the radius directions caused by the rotation can be different, and thus the information processing device can accurately align the point groups 10A and 10B obtained by integrating the point groups.

Although the case where the point groups, each of which is extracted from the three distance image frames, are integrated is described, the integration is not limited to this. For example, when a point group whose radius direction is caused by the rotation and largely different from point groups to be integrated is included in the point groups to be integrated, the point groups, each of which is extracted from two distance image frames, may be integrated and used.

Next, a configuration of the information processing device according to the third embodiment is described. The information processing device according to the third embodiment is coupled to the sensor 10a and the sensor 10b, like the first embodiment.

Figure 31:
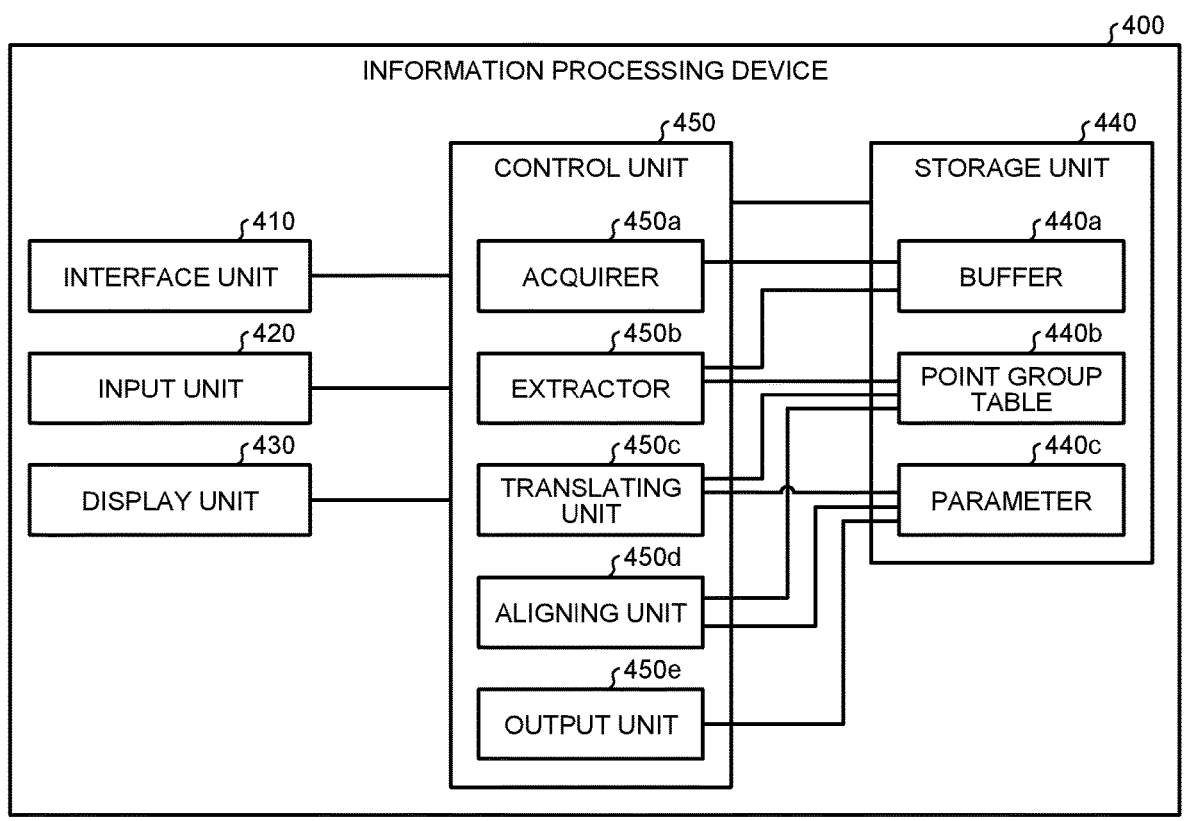
FIG. 31 is a functional block diagram illustrating a configuration of the information processing device according to the third embodiment.

FIG. 31 is a functional block diagram illustrating the configuration of the information processing device according to the third embodiment. As illustrated in FIG. 31, an information processing device 400 includes an interface unit 410, an input unit 420, a display unit 430, a storage unit 440, and a control unit 450.

A description about the interface unit 410, the input unit 420, and the display unit 430 is the same as or similar to the description about the interface unit 110, the input unit 120, and the display unit 130 that are illustrated in FIG. 8.

The storage unit 440 includes a buffer 440a, a point group table 440b, and a parameter 440c. The storage unit 440 corresponds to a semiconductor memory element, such as a RAM, a ROM, or a flash memory, or a storage device, such as an HDD.

A description about the buffer 440a, the point group table 440b, and the parameter 440c is the same as or similar to the description about the buffer 140a, the point group table 140b, and the parameter 140c that are illustrated in FIG. 8.

The control unit 450 includes an acquirer 450a, an extractor 450b, a translating unit 450c, an aligning unit 450d, and an output unit 450e. The control unit 450 can be implemented by a CPU, an MPU, or the like. The control unit 450 can be also implemented by hard wired logic, such as an ASIC or an FPGA.

The acquirer 450a is a processing unit that acquires information from the sensors 10a and 10b. The acquirer 450a causes the acquired information to be stored in the buffer 440a. Another description about the acquirer 450a is the same as or similar to the description about the acquirer 150a illustrated in FIG. 8.

The extractor 450b is a processing unit that extracts the point group 10A and the point group 10B from the first and the second distance image frames stored in the buffer 440a. The extractor 450b causes information of the point groups 10A and 10B to be stored in the point group table 440b.

An example of a process of extracting the point group 10A by the extractor 450b is described. The extractor 450b acquires first distance image frames at times tn, tn+1, and tn+2 from the table 141a of the buffer 440a. The extractor 450b acquires the first background frame 11a from the buffer 440a. The extractor 450b generates a first differential frame at the time tn from a difference between the first distance image frame at the time tn and the first background frame 11a. The extractor 450b extracts a point group of the object at the time tn based on the first differential frame at the time tn.

The extractor 450b extracts a point group of the object at the time tn+1 from the first distance image frame at the time tn+1 and extracts a point group of the object at the time tn+2 from the first distance image frame at the time tn+2 in the same manner as described above. The extractor 450b extracts the point group 10A by integrating the point groups at the times tn, tn+1, and tn+2 with each other. For example, the extractor 450b causes the extracted point group 10A to be stored as a point group at the time tn in the table 142a.

An example of a process of extracting the point group 10B by the extractor 450b is described. The extractor 450b acquires second distance image frames at the times tn, tn+1, and tn+2 from the table 141b of the buffer 440a. The extractor 450b acquires the second background frame lib from the buffer 440a. The extractor 450b generates a second differential frame at the time tn from a difference between the second distance image frame at the time tn and the second background frame lib. The extractor 450b extracts a point group of the object at the time tn based on the second differential frame at the time tn.

The extractor 450b extracts a point group of the object at the time tn+1 from the second distance image frame at the time tn+1 and extracts a point group of the object at the time tn+2 from the second distance image frame at the time tn+2 in the same manner as described above. The extractor 450b extracts the point group 10B by integrating the point groups at the times tn, tn+1, and tn+2 with each other. For example, the extractor 450b causes the extracted point group 10B to be stored as a point group at the time tn in the table 142b.

The foregoing times tn, tn+1, and tn+2 may be arbitrarily set. For example, the time when the athlete 7 starts vaulting may be input as the time tn to the information processing device 400. In addition, not only the start time of gymnastics but also start times of various performance and competitions may be input as the time tn to the information processing device 400. Furthermore, the times when the plurality of distance image frames are selected are treated as the times tn, tn+1, and tn+2, but are not limited to this and may be times tn, tn+α, and tn+β. α and β are values appropriately set.

The translating unit 450c is a processing unit that executes alignment in a translation direction by moving the origin coordinates of the sensor 10a to the average coordinates 1A of the point group 10A and moving the origin coordinates of the sensor 10b to the average coordinates 1B of the point group 10B. Another description about the translating unit 450c is the same as or similar to the description about the translating unit 150c illustrated in FIG. 8.

The aligning unit 450d is a processing unit that calculates the rotation parameters to be used to align the point group 10A and the point group 10B. Another description about the aligning unit 450d is the same as or similar to the description about the aligning unit 150d illustrated in FIG. 8.

The output unit 450e is a processing unit that outputs the parameter 440c to the scoring device.

Figure 32:
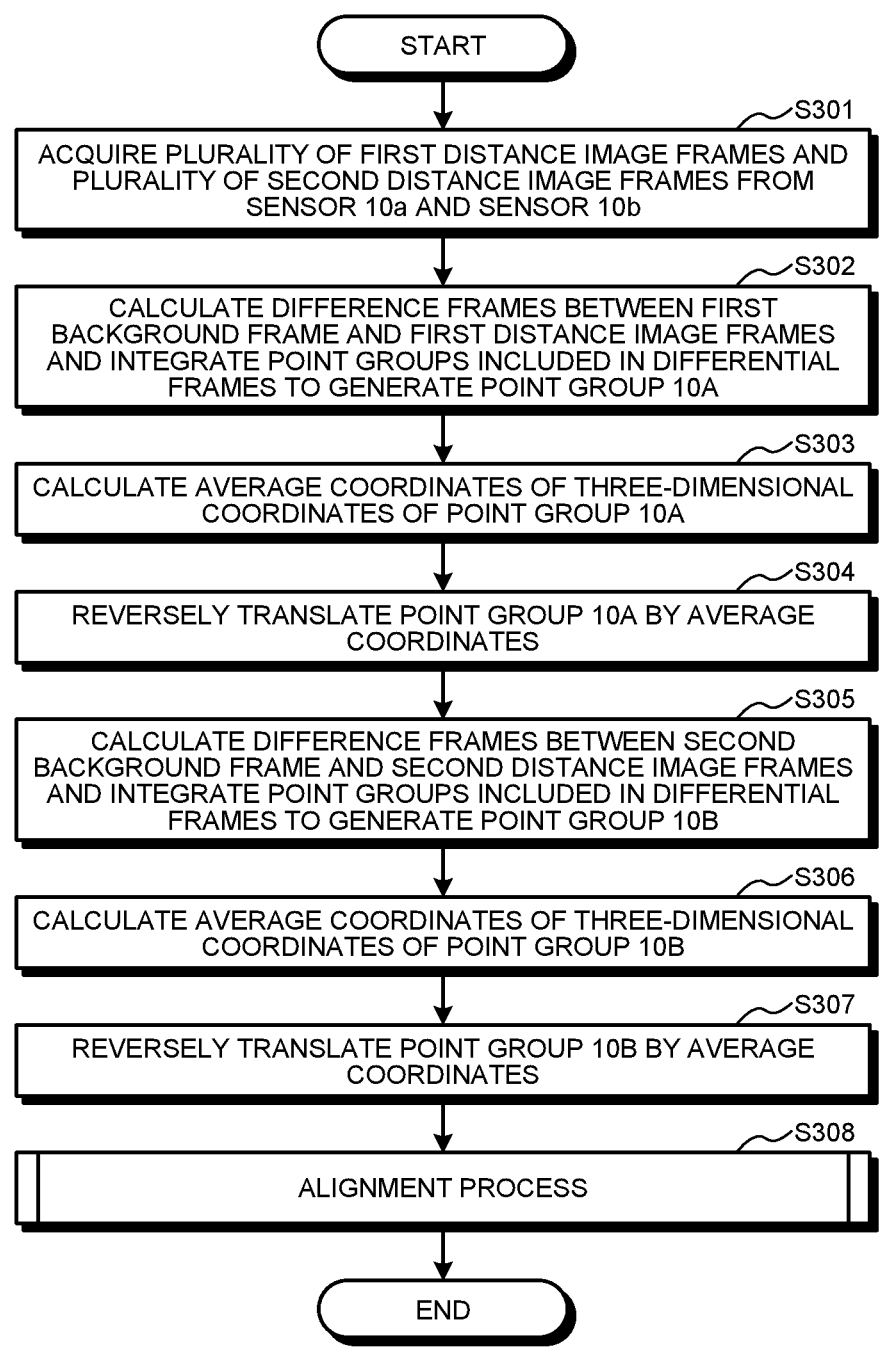
FIG. 32 is a flowchart illustrating a process procedure by the information processing device according to the third embodiment.

Next, an example of a process procedure by the information processing device 400 according to the third embodiment is described. FIG. 32 is a flowchart illustrating the process procedure by the information processing device according to the third embodiment. As illustrated in FIG. 32, the acquirer 450a of the information processing device 400 acquires a plurality of first distance image frames and a plurality of second distance image frames from the sensor 10a and the sensor 10b (step S301).

The extractor 450b of the information processing device 400 calculates differential frames between the first background frame and the first distance image frames and integrates point groups included in the differential frames with each other to generate the point group 10A (step S302). The translating unit 450c of the information processing device 400 calculates average coordinates of three-dimensional coordinates of the point group 10A (step S303). The translating unit 450c reversely translates the point group 10A by the average coordinates (step S304).

The extractor 450b calculates differential frames between the second background frame and the second distance image frames and integrates point groups included in the differential frames with each other to generate the point group 10B (step S305). The translating unit 450c calculates average coordinates of three-dimensional coordinates of the point group 10B (step S306). The translating unit 450c reversely translates the point group 10B by the average coordinates (step S307).

The aligning unit 450d of the information processing device 400 executes an alignment process (step S308). For example, the alignment process of step S308 corresponds to the processes of step S107 and later illustrated in FIG. 21.

Next, effects of the information processing device 400 according to the third embodiment are described. The information processing device 400 integrates the point groups extracted from the first distance image frames at the times t1, t2, and t3 into the point group 10A. The information processing device 400 integrates the point groups extracted from the second distance image frames at the times t1, t2, and t3 into the point group 10B. Since the radius directions caused by the rotation can be different due to the integration of the point groups at the times, the information processing device 400 can accurately align the point groups 10A and 10B obtained by integrating the point groups.

Figure 33:
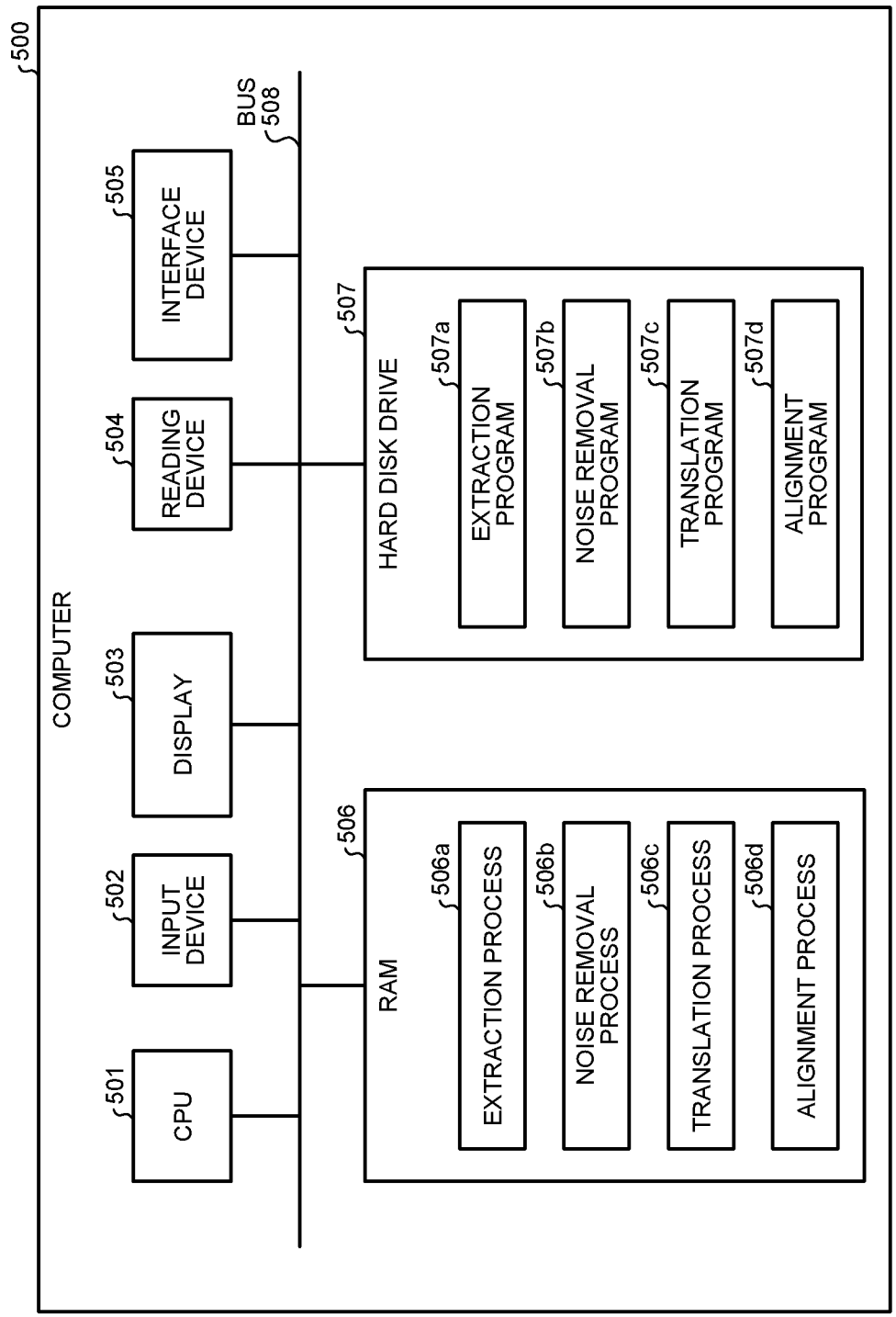
FIG. 33 is a diagram illustrating an example of a hardware configuration of a computer that implements the same functions as the information processing devices.

Next, an example of a hardware configuration of a computer that implements the same functions as those of the information processing devices 100, 300, and 400 described in the embodiments is described. FIG. 33 is a diagram illustrating the example of the hardware configuration of the computer that implements the same functions as those of the information processing devices.

As illustrated in FIG. 33, a computer 500 includes a CPU 501 for executing various arithmetic processing, an input device 502 for receiving input of data from a user, and a display 503. The computer 500 also includes a reading device 504 for reading a computer program and the like from a storage medium, and an interface device 505 for transmitting and receiving data to and from a recording device or the like via a cable or a wireless network. The computer 500 also includes a RAM 506 for temporarily storing various information, and a hard disk drive 507. The devices 501 to 507 are coupled to a bus 508.

The hard disk drive 507 includes an extraction program 507a, a noise removal program 507b, a translation program 507c, and an alignment program 507d. The CPU 501 reads the computer programs 507a to 507d and loads the read computer programs 507a to 507d into the RAM 506.

The extraction program 507a functions as an extraction process 506a. The noise removal program 507b functions as a noise removal process 506b. The translation program 507c functions as a translation process 506c. The alignment program 507d functions as an alignment process 506d.

A process by the extraction process 506a corresponds to the processes by the extractors 150b, 350b, and 450b. The noise removal process 506b corresponds to the process by the noise removing unit 355. A process by the translation process 506c corresponds to the processes by the translating units 150c, 350c, and 450c. The alignment process 506d corresponds to the processes by the aligning units 150d, 350d, and 450d.

Each of the computer programs 507a to 507d is not necessarily initially stored in the hard disk drive 507. For example, each of the computer programs may be stored in a "portable physical medium" that is to be inserted in the computer 500 and is a flexible disk (FD), a CD-ROM, a DVD, a magneto-optical disc, an IC card, or the like. Then, the computer 500 may read and execute the computer programs 507a to 507d.

It is possible to reduce a processing load caused by calculation of a translation parameter for alignment.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A calculation method executed by a processor comprising:
   first extracting a first point group constituting an object from a first distance image acquired by a first sensor among a plurality of sensors for sensing a distance to the object;
   second extracting a second point group constituting the object from a second distance image acquired by a second sensor among the sensors;
   first calculating first average coordinates of the first point group;
   second calculating second average coordinates of the second point group;
   first generating a first translated point group by moving origin coordinates of the first sensor to the first average coordinates;
   second generating a second translated point group by moving origin coordinates of the second sensor to the second average coordinates;
   calculating, based on the first translated point group and the second translated point group, a rotation parameter to be used to align the first point group and the second point group in a rotational direction; and
   calculating, based on the first translation coordinates and the second translation coordinates, a translation parameter to be used to align the first point group and the second point group in a translation direction.

2. The calculation method according to claim 1, further comprising removing edge noise from a first distance image and a second distance image, wherein the first extracting extracts a first point group constituting the object from a first distance image from which the edge noise has been removed, and the second extracting extracts a second point group constituting the object from a second distance image from which the edge noise has been removed.

3. The calculation method according to claim 1, wherein the first extracting extracts point groups constituting the object from a plurality of first distance images acquired by the first sensor at different times and integrates the extracted point groups into the first point group, and the second extracting extracts point groups constituting the object from a plurality of second distance images acquired by the second sensor at the different times and integrates the extracted point groups into the second point group.

4. The calculation method according to claim 1, wherein
   the rotation parameter and the translation parameter are applied to a new first point group extracted from a new first distance image newly acquired by the first sensor and are applied to a new second point group extracted from a new second distance image newly acquired by the second sensor, and
   the new first point group and the new second point group to which the rotation parameter and the translation parameter have been applied constitute the object in a three-dimensional space.

5. A non-transitory computer readable recording medium having stored therein a calculation program that causes a computer to execute a process comprising:
   first extracting a first point group constituting an object from a first distance image acquired by a first sensor among a plurality of sensors for sensing a distance to the object;
   second extracting a second point group constituting the object from a second distance image acquired by a second sensor among the sensors;
   first calculating first average coordinates of the first point group;
   second calculating second average coordinates of the second point group;
   first generating a first translated point group by moving origin coordinates of the first sensor to the first average coordinates;
   second generating a second translated point group by moving origin coordinates of the second sensor to the second average coordinates;
   calculating, based on the first translated point group and the second translated point group, a rotation parameter to be used to align the first point group and the second point group in a rotational direction; and
   calculating, based on the first translation coordinates and the second translation coordinates, a translation parameter to be used to align the first point group and the second point group in a translation direction.

6. The non-transitory computer readable recording medium according to claim 5, wherein
   the process further comprises removing edge noise from a first distance image and a second distance image, and
   the first extracting extracts a first point group constituting the object from a first distance image from which the edge noise has been removed, and the second extracting extracts a second point group constituting the object from a second distance image from which the edge noise has been removed.

7. The non-transitory computer readable recording medium according to claim 5, wherein the first extracting extracts point groups constituting the object from a plurality of first distance images acquired by the first sensor at different times and integrates the extracted point groups into the first point group, and the second extracting extracts point groups constituting the object from a plurality of second distance images acquired by the second sensor at the different times and integrates the extracted point groups into the second point group.

8. The non-transitory computer readable recording medium according to claim 5, wherein
   the rotation parameter and the translation parameter are applied to a new first point group extracted from a new first distance image newly acquired by the first sensor and are applied to a new second point group extracted from a new second distance image newly acquired by the second sensor, and the new first point group and the new second point group to which the rotation parameter and the translation parameter have been applied constitute the object in a three-dimensional space.

9. An information processing device comprising:

a processor configured to:

extract a first point group constituting an object from a first distance image acquired by a first sensor among a plurality of sensors for sensing a distance to the object and extract a second point group constituting the object from a second distance image acquired by a second sensor among the sensors;

calculate first average coordinates of the first point group;

calculate second average coordinates of the second point group;

generate a first translated point group by moving origin coordinates of the first sensor to the first average coordinates;

generate a second translated point group by moving origin coordinates of the second sensor to the second average coordinates;

calculate, based on the first translated point group and the second translated point group, a rotation parameter to be used to align the first point group and the second point group in a rotational direction; and calculate, based on the first translation coordinates and the second translation coordinates, a translation parameter to be used to align the first point group and the second point group in a translation direction.

10. The information processing device according to claim 9, the processor further configured to remove edge noise from a first distance image and a second distance image, extract a first point group constituting the object from a first distance image from which the edge noise has been removed, and extract a second point group constituting the object from a second distance image from which the edge noise has been removed.

11. The information processing device according to claim 9, the processor further configured to extract point groups constituting the object from a plurality of first distance images acquired by the first sensor at different times, integrate the extracted point groups into the first point group, extract point groups constituting the object from a plurality of second distance images acquired by the second sensor at the different times, and integrate the extracted point groups into the second point group.

12. The information processing device according to claim 9, wherein the rotation parameter and the translation parameter are applied to a new first point group extracted from a new first distance image newly acquired by the first sensor and are applied to a new second point group extracted from a new second distance image newly acquired by the second sensor, and the new first point group and the new second point group to which the rotation parameter and the translation parameter have been applied constitute the object in a three-dimensional space.

* * * * *